(12) United States Patent
Breitenfeld et al.

(10) Patent No.: US 10,430,558 B2
(45) Date of Patent: Oct. 1, 2019

(54) METHODS AND SYSTEMS FOR CONTROLLING ACCESS TO VIRTUAL REALITY MEDIA CONTENT

(71) Applicant: Verizon Patent and Licensing Inc., Arlington, VA (US)

(72) Inventors: Denny Breitenfeld, Florham Park, NJ (US); Qian Su, Old Bridge, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 321 days.

(21) Appl. No.: 15/141,736

(22) Filed: Apr. 28, 2016

(65) Prior Publication Data

US 2017/0316186 A1 Nov. 2, 2017

(51) Int. Cl.
| | |
|---|---|
| *G06F 15/16* | (2006.01) |
| *G06F 21/10* | (2013.01) |
| *G06F 21/31* | (2013.01) |
| *H04L 29/06* | (2006.01) |
| *G06F 21/62* | (2013.01) |

(52) U.S. Cl.
CPC ............. *G06F 21/10* (2013.01); *G06F 21/31* (2013.01); *G06F 21/6218* (2013.01); *H04L 63/08* (2013.01); *H04L 63/102* (2013.01); *H04L 63/108* (2013.01); *G06F 2221/2113* (2013.01); *H04L 63/0807* (2013.01)

(58) Field of Classification Search
CPC ......... H04L 67/14; H04L 63/10; H04L 63/08; H04L 63/0807; G06F 21/53; G06F 21/31; G06F 21/6218; G06F 2221/2149; G06F 21/62
See application file for complete search history.

(56) References Cited

U.S. PATENT DOCUMENTS

| | | | | |
|---|---|---|---|---|
| 7,127,607 B1 * | 10/2006 | Su | ............... | G06F 21/33 |
| | | | | 713/156 |
| 9,210,090 B1 * | 12/2015 | Baldi | .............. | H04L 47/2441 |
| 2007/0130001 A1 * | 6/2007 | Jung | ............... | G06Q 20/24 |
| | | | | 705/14.12 |

(Continued)

FOREIGN PATENT DOCUMENTS

| | | | | |
|---|---|---|---|---|
| EP | 2712143 A1 * | 3/2014 | ............. | H04L 63/08 |
| EP | 2712143 A1 * | 3/2014 | ............. | H04L 63/08 |
| WO | WO-2010065240 A1 * | 6/2010 | ............. | G06F 21/32 |

*Primary Examiner* — Farid Homayounmehr
*Assistant Examiner* — Lizbeth Torres-Diaz

(57) ABSTRACT

An exemplary virtual reality media content access control system ("system") selectively provides access to virtual reality media content for experiencing by a user of a media player client device ("client device"). In certain examples, the system detects a request from the client device to access an immersive virtual reality world that includes a virtual object assigned an access permissions profile, determines an access key and a device key associated with the request, validates the access key and the device key associated with the request, determines metadata associated with the access key, and selectively provides, based on the access permissions profile for the virtual object and on at least one of the device key associated with the request and the metadata associated with the access key, access to the virtual object for experiencing by the user of the client device as part of the immersive virtual reality world.

18 Claims, 15 Drawing Sheets

(56) References Cited

U.S. PATENT DOCUMENTS

| | | | | |
|---|---|---|---|---|
| 2010/0156892 A1* | 6/2010 | Chan, II | ............... | G06T 15/00 |
| | | | | 345/419 |
| 2010/0251337 A1* | 9/2010 | Amsterdam | ............ | A63F 13/12 |
| | | | | 726/4 |
| 2015/0200928 A1* | 7/2015 | Burch | .................... | G06F 9/455 |
| | | | | 726/9 |
| 2016/0380992 A1* | 12/2016 | Boodman | ............. | G06F 21/335 |
| | | | | 726/7 |
| 2017/0123750 A1* | 5/2017 | Todasco | ............... | G06F 3/1454 |

\* cited by examiner

METHODS AND SYSTEMS FOR CONTROLLING ACCESS TO VIRTUAL REALITY MEDIA CONTENT

BACKGROUND INFORMATION

Advances in computing and networking technology have made new forms of media content possible. For example, virtual reality media content is available that may immerse viewers (or "users") into interactive virtual reality worlds that the users may experience by directing their attention to any of a variety of things being presented in the immersive virtual reality world at the same time. For example, at any time during the presentation of the virtual reality media content, a user experiencing the virtual reality media content may look around the immersive virtual reality world in any direction with respect to both a horizontal dimension (e.g., forward, backward, left, right, etc.) as well as a vertical dimension (e.g., up, down, etc.), giving the user a sense that he or she is actually present in and experiencing the immersive virtual reality world.

The creation and distribution of quality media content, including virtual reality media content, is often associated with significant costs and challenges. Accordingly, media content owners and providers seek to protect the value of a media content by requiring that the media content be accessible only to authorized viewers. Media content owners and distributors typically seek not only to protect media content from unauthorized access and/or misuse, but also to provide authorized viewers with quality user experiences with the media content. Existing media content distribution technologies provide certain limited media content access controls designed to protect media content from unauthorized access. There remains, however, a need for new and/or improved access control technologies that enhance protection of the media content and/or user experiences with the media content, particularly with respect to virtual reality media content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
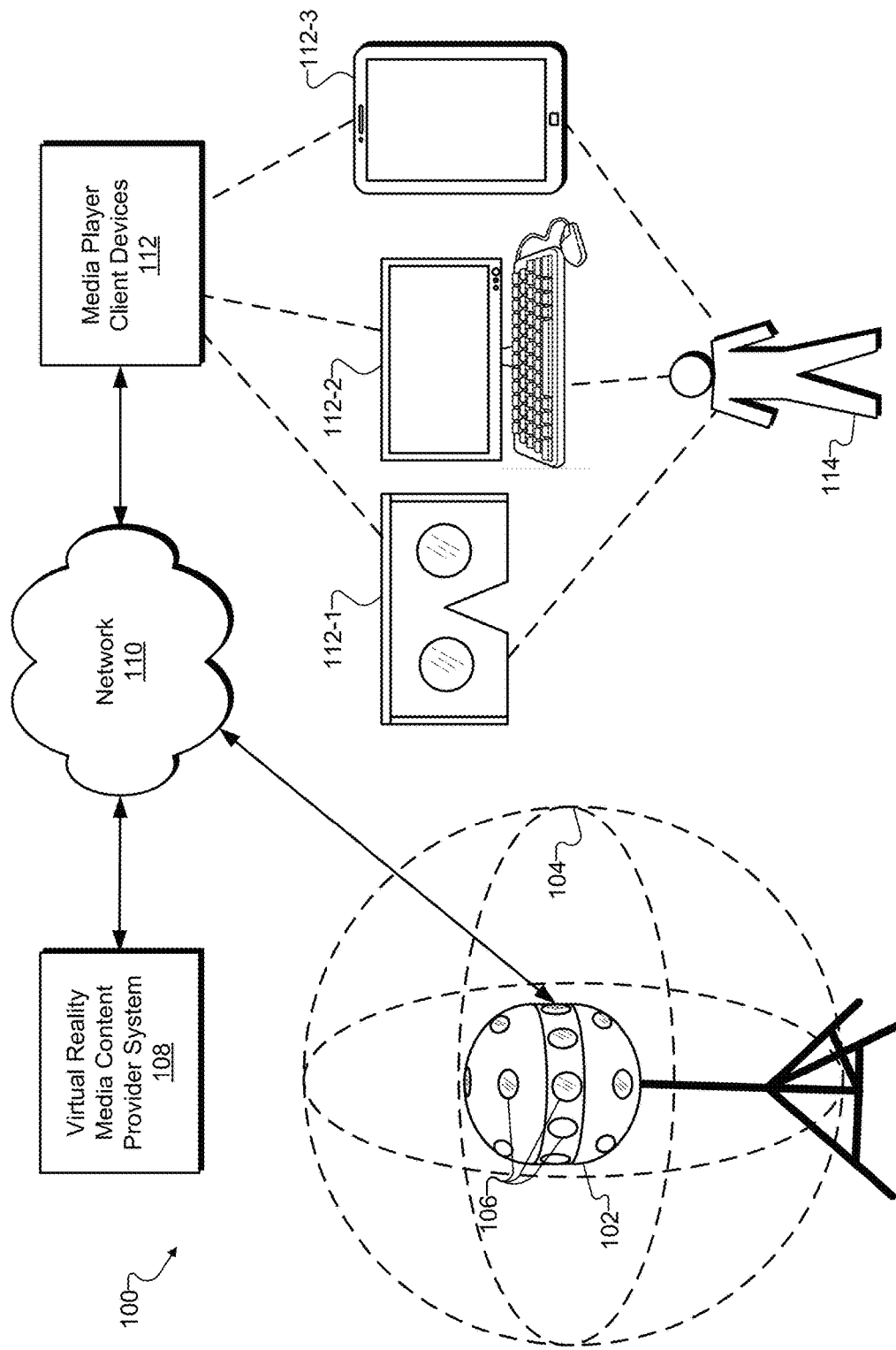
FIG. 1 illustrates an exemplary configuration in which a virtual reality media content provider system and one or more media player client devices operate to control access to virtual reality media content according to principles described herein.

Methods and systems for controlling access to virtual reality media content are described herein. As will be described and illustrated below, a virtual reality media content access control system may selectively provide access to virtual reality media content for experiencing by a user of a media player client device. In certain examples, the selective providing of access to the virtual reality media content may include the virtual reality media content access control system directing one or more components of a virtual reality media content provider system to provide the virtual reality media content to the media player client device for presentation to the user or to abstain from providing the virtual reality media content to the media player client device for presentation to the user. This may include selectively providing access to any element of or associated with the virtual reality media content, such as a behavior of the virtual reality media content (e.g., available motion and/or input behaviors), a virtual object that may be selectively presented as part of an immersive virtual world, a feature of the virtual object (e.g., a behavior of the virtual object) that may be selectively presented as part of the virtual object in an immersive virtual world, and/or a particular feature or operation of or associated with the virtual reality media content (e.g., a micro service that may be selectively provided by a micro application as part of virtual reality media content and/or a virtual reality media content service provided by a virtual reality media content service provider).

The virtual reality media content access control system may selectively provide access to virtual reality media content based on one or more factors. For example, the virtual reality media content access control system may be configured to selectively provide access to virtual reality media content based on access permissions profiles that have been assigned to elements of or associated with the virtual reality media content. As used herein, an "access permissions profile" may include any data structure that specifies a set of rules to be satisfied in order for access to one or more elements of or associated with virtual reality media content associated with the access permissions profile to be provided. For example, a particular element of an immersive virtual reality world represented by virtual reality media content (e.g., a virtual object that has been mapped to an immersive virtual reality world) may be assigned an access permissions profile that specifies a set of rules to be satisfied in order for access to the element to be provided. Examples of access permissions profiles are described herein.

In addition to access permissions profiles, the virtual reality media content access control system may be configured to selectively provide access to virtual reality media content based on authorization data associated with a user of the media player client device. In certain examples, the authorization data may include access keys and device keys associated with requests for virtual reality media content, as well as metadata associated with the access keys. Examples of such authorization data and operations pertaining to such authorization data (e.g., management and application of keys and metadata) are described herein.

As mentioned, virtual reality media content may represent an immersive virtual reality world. The immersive virtual reality world may be fully immersive in the sense that the user may not be presented with any image of the real world in which the user is located while the user is experiencing the immersive virtual reality world, in contrast to certain "augmented reality" technologies. However, while real-world scenery directly surrounding the user may not be presented together with the immersive virtual reality world, the immersive virtual reality world may, in certain examples, be generated based on data (e.g., image and/or audio data) representative of camera-captured real-world scenery rather than animated or computer-generated scenery of imaginary worlds such as those commonly generated for video games, animated entertainment programs, and so forth. For example, as will be described in more detail below, camera-captured real-world scenery may include real-world places (e.g., city streets, buildings, landscapes, etc.), real-world events (e.g., sporting events, large celebrations such as New Year's Eve or Mardi Gras, etc.), fictionalized live action entertainment (e.g., virtual reality television shows, virtual reality movies, etc.), and so forth.

The user of a media player client device may experience the immersive virtual reality world by way of a field of view. For example, the field of view may include content of the immersive virtual reality world (e.g., images depicting scenery and objects surrounding the user within the immersive virtual reality world). Additionally, the field of view may dynamically change in response to user input provided by the user as the user experiences the immersive virtual reality world. For example, the media player client device may detect user input (e.g., moving or turning the display screen upon which the field of view is presented) that represents a request to shift additional content into the field of view in place of the previous content included within the field of view. In response, the field of view may display the additional content in place of the previous content. In this way, the field of view may essentially provide the user a "window" through which the user can easily and naturally look around the immersive virtual reality world.

Methods and systems for controlling access to virtual reality media content may provide significant advantages to authorized users experiencing the virtual reality media content, virtual reality media content owners, and virtual reality media content providers distributing the virtual reality media content for experiencing by authorized users. For example, users may benefit by receiving selective access to elements of virtual reality media content, which may provide users with customized and/or unique experiences with the virtual reality media content. For example, one or more virtual objects mapped to an immersive virtual reality world, and/or particular features of the virtual objects, may be selectively presented or not presented as part of the immersive virtual realty world represented by the virtual reality media content as the user experiences the immersive virtual realty world with a media player client device.

Virtual reality media content owners and providers may also benefit from controlled access to virtual reality media content as described herein. For example, virtual reality media content owners may be able to customize presentation options for their virtual reality media content such that the virtual reality media content may be selectively provided and/or customized as desired by the owners. Additionally or alternatively, virtual reality media content providers may provide different levels of access to virtual reality media content to different users (e.g., subscribers) in which users may choose the levels at which they want to experience the virtual reality media content. For instance, certain users may be willing to pay for additional behaviors in their virtual reality media content experience.

Virtual reality media content owners and providers may benefit from the protections provided by the access controls. For example, access to the virtual reality media content distributed by a virtual reality media content provider may be efficiently restricted to authorized users, without compromising and/or while also enhancing the experiences of the users with the virtual reality media content. In addition, the access controls may provide an audit trail useful for identifying and tracing any unauthorized access of the virtual reality media content distributed by the virtual reality media content provider.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary configuration 100 in which a virtual reality media backend system and one or more media player client devices operate to control access to virtual reality media content. As shown in FIG. 1, a 360-degree camera 102 ("camera 102") may capture and/or generate a 360-degree image of real-world scenery 104 around a center point corresponding to camera 102. For example, camera 102 may capture a plurality of images from each of a plurality of segment capture cameras 106 built into or otherwise associated with camera 102, and may generate the 360-degree image of real-world scenery 104 by combining the plurality of images captured by segment-capture cameras 106.

Camera 102 may capture data representative of 360-degree images of real-world scenery 104 and transmit the data to a virtual reality media content provider system 108 ("provider system 108") by way of a network 110. After preparing and/or processing the data representative of the 360-degree images to generate an immersive virtual reality world based on the 360-degree images, provider system 108 may transmit, by way of network 110, data representative of the immersive virtual reality world to one or more media player client devices 112 such as a head-mounted virtual reality device 112-1, a personal computer device 112-2, a mobile device 112-3, and/or to any other form factor of media player client device that may serve a particular implementation. Regardless of what form factor media player client devices 112 take, a user 114 (or multiple users in other examples) may experience the immersive virtual reality world by way of media player client devices 112. Each of the elements of configuration 100 will now be described in detail.

Camera 102 may be set up and/or operated by a virtual reality content creator (e.g., a commercial studio, user 114, etc.) and may include any type of camera that is configured to capture data representative of a 360-degree image of real-world scenery 104 around a center point corresponding to camera 102. As used herein, a 360-degree image is any still or video image that depicts the surroundings (e.g., real-world scenery 104) of a center point (e.g., a center point associated with the location of camera 102) on all sides along at least one dimension. For example, one type of 360-degree image may include a panoramic image that depicts a complete 360-degree by 45-degree ring around a center point corresponding to a camera (e.g., camera 102). Another type of 360-degree image may include a spherical image that depicts not only the ring around the center point, but an entire 360-degree by 180-degree sphere surrounding the center point on all sides. In certain examples, a 360-degree image may be based on a non-circular geometric structure. For example, certain 360-degree images may be based on cubes, rectangular prisms, pyramids, and/or other geometric structures that may serve a particular implementation, rather than being based on spheres.

Camera 102 may be configured to capture the data representative of the 360-degree image of real-world scenery 104 in any way that may serve a particular implementation. For example, as shown in FIG. 1, camera 102 may capture various segments of real-world scenery 104 using segment capture cameras 106, which may each capture an image of a single segment of real-world scenery 104 that may be combined (e.g., stitched together) with other segments to generate the 360-degree image of real-world scenery 104. In certain examples, segment capture cameras 106 may each represent a single camera unit (e.g., including a lens and suitable image capture hardware) built into a single 360-degree camera configured to capture 360-degree images. In other examples, camera 102 may include an array of segment capture cameras 106 that are each a single, standalone camera configured to capture standard images (e.g., images depicting less than a 360-degree view) that may later be combined to form the 360-degree image. In yet other examples, camera 102 may include one or more "fish-eye" lenses configured to capture a very wide-angle image (e.g., a spherical image or a semi-spherical image) that can be used as the 360-degree image or processed to generate the 360-degree image. Alternatively, camera 102 may include a single, standard camera that captures and/or combines a plurality of still images of real-world scenery 104 taken at different points in time (e.g., using a "panorama mode" of the camera or a similar feature) to capture still 360-degree images. In certain examples, camera 102 may include one or more cameras for a stereoscopic effect. Camera 102 may also use any combination of the 360-degree image capture techniques described above or any other capture techniques that may serve a particular implementation.

Subsequent to capturing raw image data representative of real-world scenery 104, camera 102 may generate from the raw image data a 360-degree image of real-world scenery 104. For example, camera 102 may be configured to automatically process the raw image data (e.g., by combining a plurality of images captured by segment capture cameras 106, by processing images captured by a fish-eye lens, etc.) to form the 360-degree image, and then may transmit data representative of the 360-degree image to provider system 108. Alternatively, camera 102 may be configured to transmit the raw image data directly to provider system 108, and any processing and/or combining of the raw image data may be performed within provider system 108.

Camera 102 may capture any real-world scenery 104 that may serve a particular embodiment. For example, real-world scenery 104 may include any indoor or outdoor real-world location such as the streets of a city, a museum, a scenic landscape, a satellite orbiting and looking down upon the Earth, the surface of another planet, or the like. Real-world scenery 104 may further include certain events such as a stock car race, a football game or other sporting event, a large-scale party such as New Year's Eve on Times Square in New York City, or other events that may interest potential users. In certain examples, real-world scenery 104 may be a setting for a fictionalized event, such as a set of a live-action virtual reality television show or movie.

In some implementations, capturing real-world scenery 104 using camera 102 may be optional. For example, a 360-degree image of scenery surrounding a center point may be completely computer-generated (e.g., animated) based on models of an imaginary world rather than captured from real-world scenery 104 by camera 102. As such, camera 102 may be omitted in certain examples. Accordingly, an immersive virtual world may include real-world camera-captured scenery, computer-generated virtual scenery, or a combination of real-world camera-captured scenery and computer-generated virtual scenery.

Provider system 108 may be associated with (e.g., provided and/or managed by) a virtual reality media content service provider (e.g., a network service provider, a cable service provider, a satellite service provider, an Internet service provider, a provider of virtual reality mobile applications, etc.) and may be configured to provide virtual reality media content to users (e.g., subscribers of a virtual reality media content service, users who download or otherwise acquire virtual reality mobile applications) by way of media player client devices 112. To this end, provider system 108 may receive, generate, process, and/or maintain data representative of virtual reality media content. For example, provider system 108 may be configured to receive camera-captured data (e.g., video data captured by camera 102) representative of a 360-degree image of real-world scenery 104 around a center point corresponding to camera 102. If the camera-captured data is raw image data (e.g., image data captured by each of segment capture cameras 106 that has not been combined into a 360-image), provider system 108 may unwrap, combine (i.e., stitch together), or otherwise process the raw image data to form the 360-degree image representative of real-world scenery 104.

Based on the camera-captured data representative of real-world scenery 104 (e.g., the 360-degree image), provider system 108 may generate and maintain an immersive virtual reality world (i.e., data representative of an immersive virtual reality world that may be experienced by a user). For example, provider system 108 may generate a three-dimensional ("3D") model of the immersive virtual reality world where virtual objects may be presented along with projections of real-world scenery 104 to a user experiencing the immersive virtual reality world. To generate the immersive virtual reality world, provider system 108 may perform video transcoding, slicing, orchestration, modeling, and/or any other processing that may serve a particular embodiment.

As part of generating and maintaining an immersive virtual reality world, provider system 108 may map one or more virtual objects to the immersive virtual reality world such that the virtual objects are identifiable and accessible for selective presentation within the immersive virtual reality world as part of the immersive virtual reality world. The mapping may be performed in any suitable way, including by provider system 108 associating a virtual object (e.g., a 3D virtual object) to a particular position and orientation within the 3D model of the immersive virtual reality world such that the virtual object may be selectively presented as part of the immersive virtual reality world when the position and/or orientation of the virtual object is within a field of view of the immersive virtual reality world. In other examples, a virtual reality media content creator or owner may generate the immersive virtual reality world, including mapping one or more virtual objects to the immersive virtual reality world. In such examples, the virtual reality media content creator or owner may provide (e.g., upload) data representative of the immersive virtual reality to provider system 108 for distribution by provider system 108.

A virtual object may include any 2D or 3D virtual object that may be included in a presentation of an immersive virtual reality world and experienced by a user who is experiencing the immersive virtual reality world. For example, a virtual object may include a viewable menu object, a promotional object, a supplementary content object, or any other object that may be presented as part of the immersive virtual reality world. A virtual object may include one or more features. For example, a virtual object may include certain behaviors (e.g., operations, movements, etc.) and/or other attributes (e.g., resolution, color, brightness, etc.) that may be presented in the immersive virtual reality world. Accordingly, virtual reality media content may represent an immersive virtual reality world and one or more virtual objects mapped to the immersive virtual reality world. Examples of such virtual reality media content and of controlling access to such virtual reality media content are described herein.

Subsequent to or concurrent with generating or receiving data representative of one or more immersive virtual reality worlds associated with one or more virtual reality media content instances (also referred to herein as "virtual reality media content programs"), provider system 108 may provide access to the virtual reality media content programs for users such as subscribers of a virtual reality media content service operated by the virtual reality media content provider and/or users who download or otherwise acquire virtual reality mobile applications provided by the virtual reality media content provider. To this end, provider system 108 may present a field of view of the immersive virtual reality world to users by way of media player client devices 112 in response to requests from media player client devices 112 to access the virtual reality media content. For example, as will be described in more detail below, provider system 108 may present the field of view by transmitting virtual reality media content data representative of content of the immersive virtual reality world (e.g., virtual objects within the immersive virtual reality world, images of real-world scenery 104, etc.) to media player client devices 112, which may render the data to display the content on their screens. Examples of immersive virtual reality worlds, fields of view of immersive virtual reality worlds, and virtual objects presented along with projections of real-world scenery 104 within immersive virtual reality worlds will be described below.

Camera 102, provider system 108, and media player client devices 112 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Network 110 may include any wired or wireless provider-specific network (e.g., a cable or satellite carrier network or a mobile telephone network), the Internet, wide area network, or any other suitable network. Data may flow between camera 102, provider system 108, and media player client devices 112 by way of network 110 using any communication technologies, devices, media, and protocols as may serve a particular implementation. While only one network 110 is shown to interconnect camera 102, provider system 108, and media player client devices 112 in FIG. 1, it will be recognized that these devices and systems may intercommunicate by way of multiple interconnected networks as may serve a particular implementation.

Media player client devices 112 (i.e., head-mounted virtual reality device 112-1, personal computer device 112-2, and mobile device 112-3) may be used by one or more users (e.g., user 114) to access and experience virtual reality media content received from provider system 108. To this end, media player client devices 112 may each include or be implemented by any device capable of presenting a field of view of an immersive virtual reality world and detecting user input from a user to dynamically change the content within the field of view as the user experiences the immersive virtual reality world. For example, media player client devices 112 may include or be implemented by a head-mounted virtual reality device (e.g., a virtual reality gaming device), a personal computer device (e.g., a desktop computer, laptop computer, etc.), a mobile or wireless device (e.g., a smartphone, a tablet device, a mobile reader, etc.), or any other device or configuration of devices that may serve a particular implementation to facilitate receiving and/or presenting virtual reality media content. As will be described in more detail below, different types of media player client devices 112 (e.g., head-mounted virtual reality devices, personal computer devices, mobile devices, etc.) may provide different types of virtual reality experiences having different levels of immersiveness for users (e.g., different levels and/or types of user motion input control, different content display hardware, etc.).

Media player client devices 112 may be configured to allow users to select respective virtual reality media content programs that users may wish to experience on media player client devices 112. In certain examples, media player client devices 112 may download virtual reality media content programs that users may experience offline (e.g., without an active connection to provider system 108). In other examples, media player client devices 112 may request and receive data streams representative of virtual reality media content programs that users experience while media player client devices 112 remain in active communication with provider system 108 by way of network 110.

To facilitate users in experiencing virtual reality media content, each of media player client devices 112 may include or be associated with at least one display screen upon which a field of view of an immersive virtual reality world may be presented. Media player client devices 112 may also include software configured to receive, maintain, and/or process data representative of the immersive virtual reality world to present content of the immersive virtual reality world within the field of view on the display screens of the media player client devices. For example, media player client devices 112 may include dedicated, standalone software applications (e.g., mobile applications) configured to process and present data representative of immersive virtual reality worlds on the displays. In other examples, the software used to present the content of the immersive virtual reality worlds may include non-dedicated software such as standard web browser applications.

Figure 2:
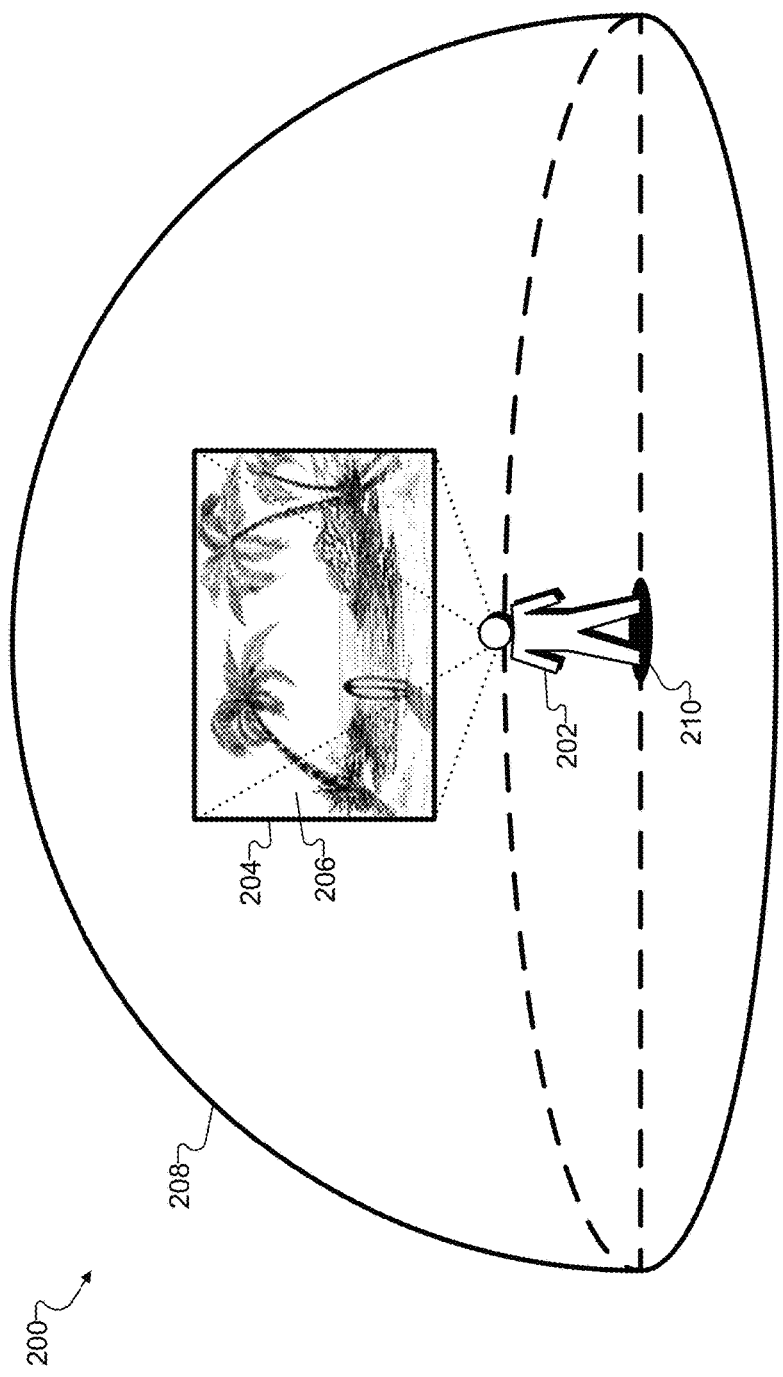
FIG. 2 illustrates an exemplary virtual reality experience in which a user is presented with an exemplary field of view that includes content of an exemplary immersive virtual reality world according to principles described herein.

FIG. 2 illustrates an exemplary virtual reality experience 200 in which a user 202 is presented with an exemplary field of view 204 that includes content 206 of an exemplary immersive virtual reality world 208. User 202 may experience immersive virtual reality world 208 ("world 208") by providing user input to dynamically change field of view 204 to display whatever content within world 208 that user 202 wishes to view. For example, the user input provided by user 202 may include an indication that user 202 wishes to look at content not currently presented within field of view 204 (i.e., content of world 208 other than content 206). For media player client devices 112 such as personal computer device 112-2 and/or mobile device 112-3, this user input may include a mouse movement, navigation key input from a keyboard, a swipe gesture, or the like. For media player client devices 112 incorporating particular sensors (e.g., motion, directional, and/or orientation sensors) such as head-mounted virtual reality device 112-1 and/or mobile device 112-3, however, this user input may include a change to an orientation of the display screen of the media player client device 112 with respect to at least one axis of at least two orthogonal axes. For example, the media player client device may be configured to sense changes in orientation of the display screen with respect to an x-axis, a y-axis, and a z-axis that are all orthogonal to one another. As such, the media player client device 112 may be configured to detect the change to the orientation of the display screen as user 202 experiences world 208, and the dynamic changing of the content includes gradually replacing content 206 with other content of world 208 that is determined to be visible from a viewpoint of user 202 within world 208 according to the detected change to the orientation of the display screen with respect to the at least one axis.

To illustrate, FIG. 2 shows that content 206 may include real-world scenery depicting a beach with palm trees and a surfboard. User 202 may provide user input to a media player client device by which user 202 is experiencing world 208 (e.g., one of media player client devices 112) to indicate that user 202 wishes to look at content to the left of content 206 currently included within field of view 204. For example, user 202 may press a left navigation key on a keyboard, perform a swipe gesture to the right, or change the orientation of the display screen with respect to a y-axis by rotating his or her head to the left while wearing a head-mounted device. In response, the real-world scenery (i.e., the palm trees, the surfboard, etc.) may scroll to the right across field of view 204 to give user 202 a sensation that he or she is turning to look to the left in world 208. As content 206 scrolls off the right side of field of view 204, new content (not explicitly shown in FIG. 2) smoothly scrolls onto the left side of field of view 204. In this way, user 202 may provide user input to cause field of view 204 to present any part of world 208 that user 202 desires.

In FIG. 2, world 208 is illustrated as a semi-sphere, indicating that user 202 may look in any direction that is substantially forward, backward, left, right, and/or up. However, if user 202 directs field of view 204 down, world 208 may not include dynamic and/or real-world scenery content to be presented within field of view 204. For example, if world 208 includes a dynamic immersive virtual reality world (i.e., using a 360-degree video image), field of view 204 may present a still image representative of the ground of world 208. In other examples, field of view 204 may present nothing (i.e., a black screen), a menu, one or more virtual objects, or any other suitable image that may serve a particular implementation. In other examples, world 208 may include an entire 360-degree by 180-degree sphere so that every direction in which user 202 may direct field of view 204 is associated with dynamic and/or real-world scenery content of world 208.

As shown in FIG. 2, world 208 may appear to surround a center point 210 associated with user 202. In some embodiments, center point 210 may correspond to a location of a camera (e.g., camera 102) used to capture the content of world 208 (e.g., including content 206). As such, center point 210 may be static or may move through world 208 in a way that user 202 is unable to control (e.g. moving through world 208 in a same manner as camera 102 moved through real-world scenery 104 during the creation of the virtual reality media content). In other embodiments, user 202 may be able to provide input to modify where center point 210 is located within world 208. For example, user 202 may hop from one center point to another (e.g., corresponding to where each of a plurality of 360-degree cameras captured 360-degree images) within world 208 or cause center point 210 to move continuously within world 208. While center point 210 is illustrated at the feet of user 202 for simplicity of illustration, it will be understood that center point 210 may actually be located at the eye level of user 202.

Figure 3:
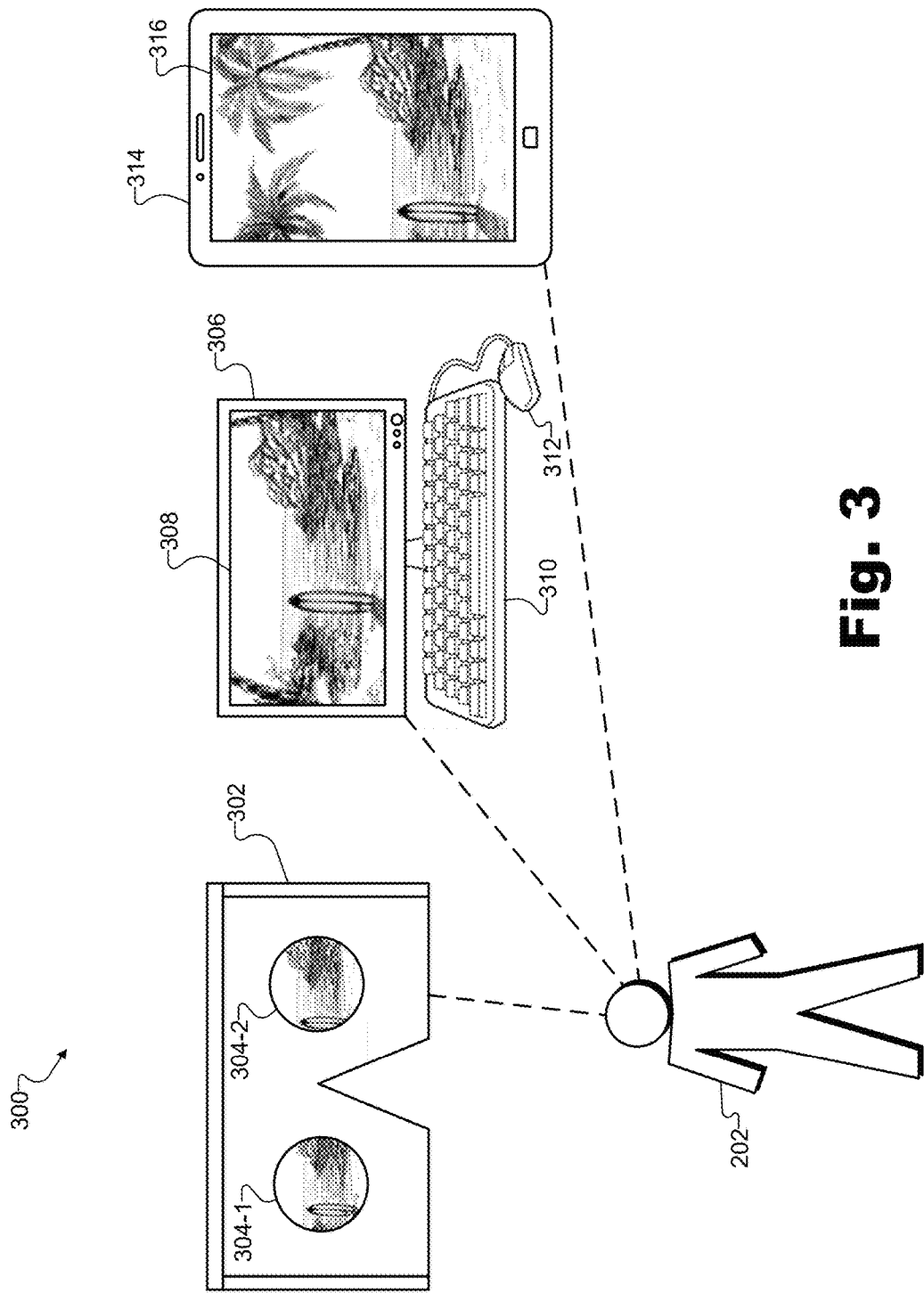
FIG. 3 illustrates exemplary media player client devices configured to facilitate experiencing the exemplary immersive virtual reality world of FIG. 2 by a user according to principles described herein.

As mentioned above, different types of media player client devices may provide different experiences for user 202 by presenting field of view 204 of world 208 in different ways, by receiving user input from user 202 in different ways, and so forth. To illustrate, FIG. 3 shows exemplary media player client devices 300 configured to facilitate experiencing of world 208 by user 202. Media player client devices 300 may correspond to media player client devices 112, described above in relation to FIG. 1.

As one example, a head-mounted virtual reality device 302 may be mounted on the head of user 202 and arranged so that each of the eyes of user 202 sees a distinct display screen 304 (e.g., display screens 304-1 and 304-2) within head-mounted virtual reality device 302. In some examples, a single display screen 304 may be presented and shared by both eyes of user 202. In other examples, as shown, distinct display screens 304 within head-mounted virtual reality device 302 may be configured to display slightly different versions of field of view 204 (e.g., stereoscopic versions of field of view 204 that may be captured by one or more cameras) to give user 202 the sense that world 208 is three-dimensional. Display screens 304 may also be configured to display content 206 such that content 206 fills the peripheral vision of user 202, providing even more of a sense of realism to user 202. Moreover, head-mounted virtual reality device 302 may include motion sensors (e.g., accelerometers), directional sensors (e.g., magnetometers), orientation sensors (e.g., gyroscopes), and/or other suitable sensors to detect natural movements (e.g., head movements) of user 202 as user 202 experiences world 208. Thus, user 202 may provide input indicative of a desire to move field of view 204 in a certain direction and by a certain amount in world 208 by simply turning his or her head in that direction and by that amount. As such, head-mounted virtual reality device 302 may provide user 202 with a natural and hands-free experience that does not require any physical console control to experience the immersive virtual reality world and that may be the most immersive virtual reality experience provided by any type of media player client device. In other examples, head-mounted virtual reality device 302 may be communicatively connected to one or more sensor devices and/or input devices such that the user may provide additional types of input to control the immersive virtual reality world experience (e.g., hand-held devices, user-wearable devices, etc. that allow for detection of motion and/or position of specific parts of a body of user 202).

As another example of a media player client device, a personal computer device 306 having a display screen 308 (e.g., a monitor) may be used by user 202 to experience world 208. Because display screen 308 may not provide the distinct stereoscopic view for each of the user's eyes and/or may not fill the user's peripheral vision, personal computer device 306 may not provide the same degree of immersiveness that head-mounted virtual reality device 302 provides. However, personal computer device 306 may be associated with other advantages such as its ubiquity among casual virtual reality users that may not be inclined to purchase or use a head-mounted virtual reality device. In some examples, personal computer device 306 may allow a user to experience virtual reality content within a standard web browser so that user 202 may conveniently experience world 208 without using special devices or downloading special software. User 202 may provide user input to personal computer device 306 by way of a keyboard 310 (e.g., using navigation keys on keyboard 310 to move field of view 204) and/or by way of a mouse 312 (e.g., by moving mouse 312 to move field of view 204). In certain examples, a combination of keyboard 310 and mouse 312 may be used to provide user input such as by moving field of view 204 by way of navigation keys on keyboard 310 and clicking or otherwise interacting with objects within world 208 by way of mouse 312.

As yet another example of a media player client device, a mobile device 314 having a display screen 316 may be used by user 202 to experience world 208. Mobile device 314 may incorporate certain advantages of both head-mounted virtual reality devices and personal computer devices to provide the most versatile type of media player client device for experiencing world 208. Specifically, like personal computer devices, mobile devices are extremely ubiquitous, potentially providing access to many more people than dedicated head-mounted virtual reality devices. However, because many mobile devices are equipped with motion sensors, directional sensors, orientation sensors, etc., mobile devices may also be configured to provide user 202 with an immersive experience comparable to that provided by head-mounted virtual reality devices. For example, mobile device 314 may be configured to divide display screen 316 into two versions (e.g., stereoscopic versions) of field of view 204 and to present content 206 to fill the peripheral vision of user 202 when mobile device 314 is mounted to the head of user 202 using a relatively inexpensive and commercially-available mounting apparatus (e.g., a cardboard apparatus). In other embodiments, mobile device 314 may facilitate experiencing world 208 by receiving movement-based user input at arm's length (i.e., not mounted to the head of user 202 but acting as a hand-held dynamic window for looking around world 208), by receiving swipe gestures on a touchscreen, or by other techniques that may serve a particular embodiment.

While examples of certain media player client devices have been described, the examples are illustrative and not limiting. A media player client device may include any suitable device and/or configuration of devices configured to facilitate receipt and presentation of virtual reality media content according to principles described herein. For example, a media player client device may include a tethered device configuration (e.g., a tethered headset device) or an untethered device configuration (e.g., a display screen untethered from a processing device). As another example, a head-mounted virtual reality media player client device or other media player client device may be used in conjunction with a virtual reality controller such as a wearable controller (e.g., a ring controller) and/or a hand-held controller.

In certain examples, a user (e.g., user 114 or user 202) may use multiple client devices to interact with provider system 108. The client devices may include devices with media player capabilities (i.e., media player client devices) and devices without media player capabilities (e.g., a virtual reality camera device, a virtual reality controller). Such devices may be used independently or in a tethered configuration to interact with provider system 108. A set of client devices associated with a user may be referred to as a "client device system."

Figure 4:
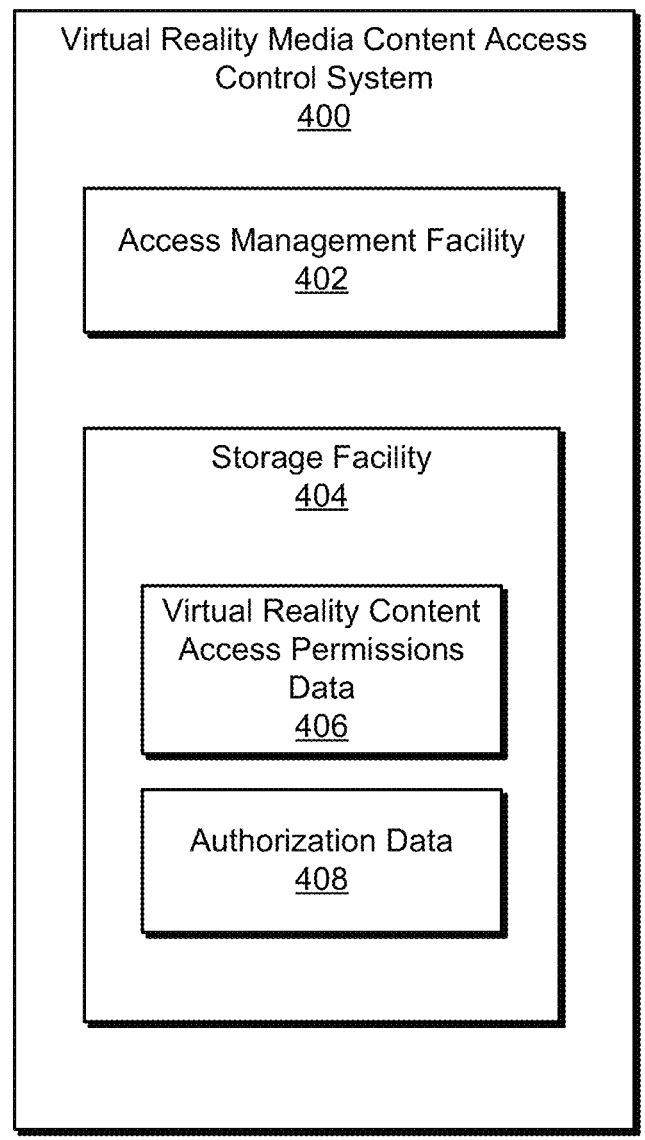
FIG. 4 illustrates an exemplary virtual reality media content access control system configured to control access to virtual reality media content according to principles described herein.

As mentioned, a virtual reality media content access control system may control access to virtual reality media content provided by a virtual reality media content provider system such as provider system 108. FIG. 4 illustrates an exemplary virtual reality media content access control system 400 ("system 400") configured to control access to virtual reality media content. As shown, system 400 may include, without limitation, an access management facility 402 and a storage facility 404 selectively and communicatively coupled to one another. It will be recognized that although facilities 402 and 404 are shown to be separate facilities in FIG. 4, facilities 402 and 404 may be combined into a single facility or divided into more facilities as may serve a particular implementation.

System 400 may be implemented by or may include one or more devices and/or systems of configuration 100, described above in relation to FIG. 1. For example, system 400 may be implemented entirely by provider system 108, entirely by one of media player client devices 112, or by any combination of provider system 108 and a media player client device 112 that may serve a particular implementation.

Storage facility 404 may maintain or access virtual reality content access permissions data ("permissions data") 406 and authorization data 408 generated, received, transmitted, and/or used by access management facility 402. Permissions data 406 may represent one or more access permissions profiles that specify rules to be satisfied in order for access to virtual reality media content associated with the access permissions profiles to be provided. For example, permissions data 406 may represent an access permissions profile that has been assigned to a virtual object mapped to an immersive virtual reality world. An access permissions profile may be define by a content owner, content provider, service provider, or any other party as may suit a particular implementation and/or desired way to control access to virtual reality media content. Examples of access permissions profiles are described herein.

Authorization data 408 may represent access keys and device keys. An access key may include any key, token, or other data that is associated with an authenticated user login session with provider system 108 (e.g., with a service provided by provider system 108). In certain examples, system 400 may generate an access key when a user authenticates to provider system 108 and provider system 108 initiates a user login session. System 400 may assign the access key to the user login session specifically, in which case the access key may be referred to as a "session access key" and may have an active lifespan that lasts throughout the user login session and ends upon termination of the user login session.

A device key may include any key, token, or other data that is associated with a client device associated with a user of provider system 108 (e.g., with a user account with provider system 108). In certain examples, system 400 may generate and assign a device key to a client device when the client device is registered with provider system 108, such as when the client device is first used by a user to authenticate the user to provider system 108. System 400 may associate the device key with the client device specifically and assign the device key a predetermined active lifespan. In certain examples, system 400 may select, from a plurality of active lifespans, which lifespan to assign to the device key for the client device based on one or more attributes of the client device (e.g., what type of input interface is provided by the client device, a type, make, model, or manufacturer of the client device, etc.).

Authorization data 408 may also represent metadata associated with access keys. The metadata may include static information associated with an access key, such as user profile information associated with an account of a user with provider system 108 (e.g., user demographic information, user preferences, subscription levels, etc.). When the user logs into provider system 108 with the user login session, system 400 may associate the access key with the user profile for the user. Additionally or alternatively, the metadata may include session-specific information ("session metadata") that is associated with an access key and that is specific to an active user login session with provider system 108. As described herein, system 400 may generate session metadata based on user interactions with provider system 108 during the user login session.

System 400 may map a device key to an access key. For example, when a client device assigned a device key is used to interact with provider system 108 during a user login session, system 400 may associate the device key with the access key assigned to the user login session. In certain examples, the association of the device key to the access key may be recorded as part of the session metadata for the user login session and may be used as a basis for selectively controlling access to virtual reality media content.

Access management facility 402 may perform any suitable operations for proper functionality of system 400. For example, access management facility 402 may perform operations to authenticate a user to provider system 108, operations to initiate and terminate user login sessions with provider system 108, and operations to generate and manage access keys, device keys, and metadata that may be used for controlling access to virtual reality media content. For example, access management facility 402 may receive a login request from a user to login to provider system 108, authenticate the user based on credentials for the user included with the request, allow an initiation of a login session for the user with provider system 108, generate and assign an access key to the login session, associate a device key for the client device to the access key, track interactions of the user with provider system 108 during the login session, generate session metadata for the login session based on the tracked interactions of the user with provider system 108 during the login session, and store, during the login session, the generated session metadata as part of metadata associated with the access key.

Figure 5:
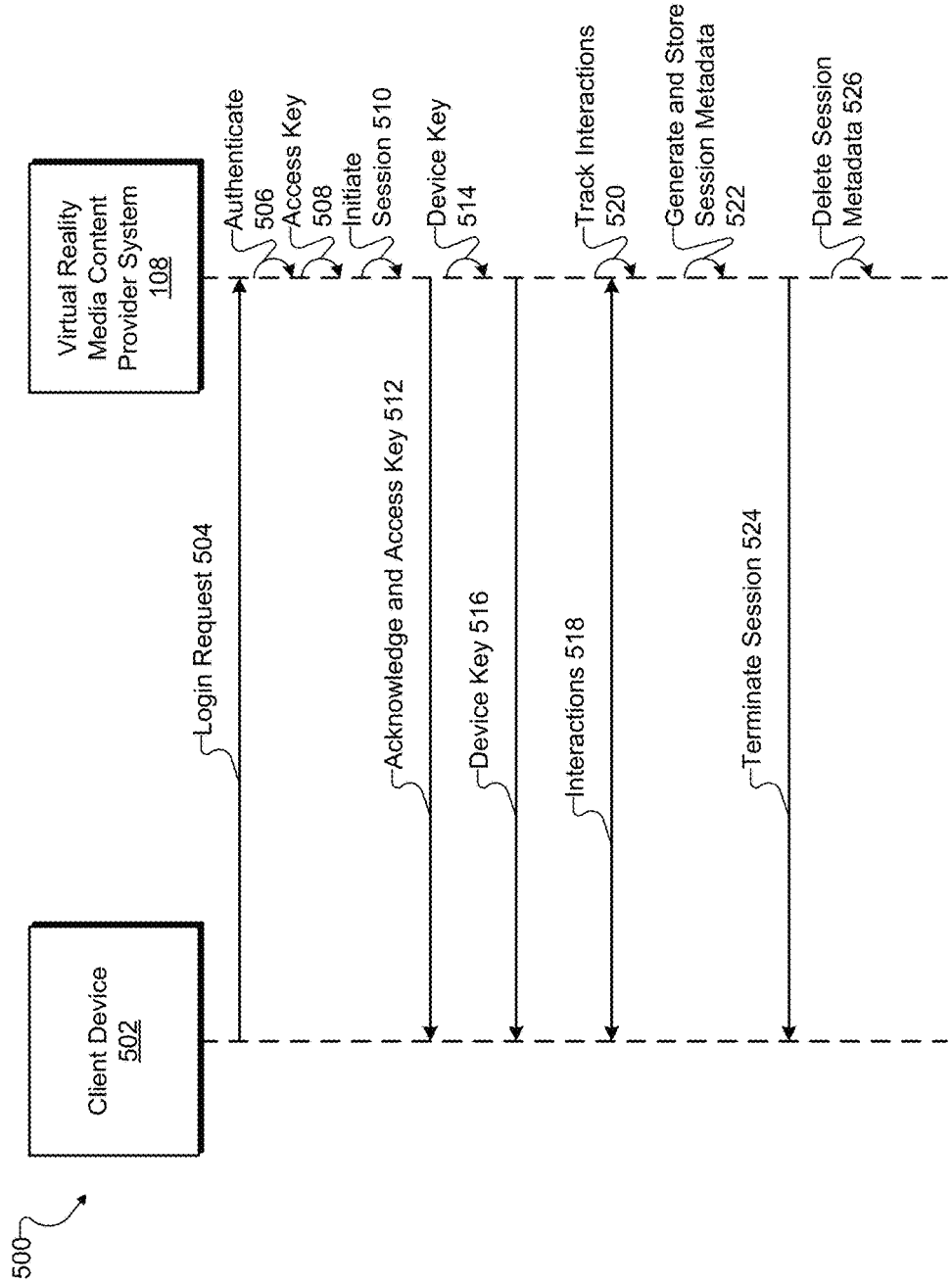
FIG. 5 illustrates an exemplary dataflow associated with a user login session with a virtual reality media content provider system according to principles described herein.

FIG. 5 illustrates an exemplary dataflow 500 associated with operations that may be performed by access management facility 402 (where access management facility 402 is implemented by provider system 108, for example) in relation to a user login session with provider system 108. As shown, provider system 108 may receive a login request (operation 504) from a client device 502. The login request may include user credentials for a user requesting to login to provider system 108. Provider system 108 may use the credentials to authenticate (operation 506) the user in any suitable way. In response to authentication, provider system 108 may generate an access key (operation 508), initiate a login session (operation 510), and assign the access key to the login session. Provider system 108 may then send an acknowledgment message and a copy of the access key to client device 502 (operation 512). Client device 502 may maintain and use the copy of the access key during a lifespan of the access key (i.e., during the login session).

Provider system 108 may determine a device key for client device (operation 514). If client device 502 is being used to login to provider system 108 for the first time, provider system 108 may generate the device key (operation 514) and send a copy of the device key to client device 502 (516). Client device 502 may maintain and use the copy of the device key for interactions with provider system 108 during a lifespan of the device key. If client device 502 has been used previously to interact with provider system 108, client device 502 will include its previously assigned device key with the login request, in which case provider system 108 may determine whether the device key is still active (operation 514). If the device key is still active, provider system 108 need not send a copy of the device key to client device. If the device key is no longer active (i.e., the lifespan of the device key has expired), provider system 108 may generate a new device key (operation 514) and send a copy of the new device key to client device 502 (operation 516).

During the login session, the user of client device 502 may interact with provider system 108 (operation 518). The interactions may include interactions of client device 502 and/or one or more other client devices of the user with provider system 108. Provider system 108 may track the interactions between the user and provider system 108 (operation 520). The tracking of the interactions may be performed in any suitable way, including by detecting requests from client device 502 and responses provided by provider system 108. The tracked interactions may represent a history of user interaction specific to the login session.

Based on the tracked interactions, provider system 108 may generate and store session metadata (operation 522) that includes information representative of and/or derived from the tracked interactions. For example, if a user uses a particular client device to interact with provider system 108 during the login session, access management facility 402 may generate session metadata that indicates a relationship between the device key for the client device and the access key for the login session. This relationship may be temporarily maintained in the session metadata during the login session and used as a basis for selectively controlling access to virtual reality media content during the login session.

As another example, if a user uses a virtual reality camera client device to capture virtual reality media content at a get-together with friends at a beach and a mobile client device to edit the captured virtual reality media content (e.g., tag the virtual reality media content with a comment or information about its subject matter) and upload the virtual reality media content to provider system 108, access management facility 402 may generate session metadata that indicates that the user used the virtual reality camera client device and the mobile client device during the login session, a geographic location at which the virtual reality media content was captured and/or edited, and information about the subject matter of the virtual reality media content (e.g., based on the tag and/or other available information). This relationship may be temporarily maintained in the session metadata during the login session and used as a basis for selectively controlling access to virtual reality media content during the login session.

Provider system 108 may terminate the login session (524). This may be performed in any suitable manner and in response to an occurrence of any suitable predefined session termination trigger event. For example, provider system 108 may terminate the login session in response to a logout request received from client device 502 or in response to a session timeout.

In certain examples, provider system 108 may delete the session metadata (526) that had been generated and stored during the login session. This may allow provider system 108 to provide truly session-specific access control of virtual reality media content. In other examples, provider system 108 may keep at least a portion of the session metadata for use in controlling access to virtual reality media content during one or more future login sessions.

The performance of the operations of dataflow 500 may result in the generation and maintenance of access keys, device keys, and metadata that may be used by access management facility 402 to selectively provide access to virtual reality media content. For example, access management facility 402 may use the access key, the device key, and/or the session metadata generated or used in dataflow 500 to determine whether to provide the user and/or client device 502 with access to specific virtual reality media content available for access from provider system 108. For instance, while the login session is still active, access management facility 402 may detect a request from client device 502 to access virtual reality media content (e.g., data representative of an immersive virtual reality world, such as world 208), determine an access key and a device key associated with the request, validate the access key and the device key associated with the request, determine metadata associated with the access key, and selectively provide access to the virtual reality media content (e.g., to one or more elements of the immersive virtual reality world) based on one or more access permissions profiles associated with the virtual reality media content (e.g., one or more access permissions profiles associated with the one or more elements of the immersive virtual reality world) and on at least one of the device key associated with the request and the metadata associated with the access key. In certain examples, the virtual reality media content may represent an immersive virtual reality world that may include a virtual object that has been mapped to the immersive virtual reality world and assigned an access permissions profile, and access management facility 402 may selectively provide, based on the access permissions profile that has been assigned to the virtual object and on at least one of the device key associated with the request and the metadata associated with the access key, access to the virtual object for experiencing by a user of the media player client device as part of the immersive virtual reality world.

Figure 6:
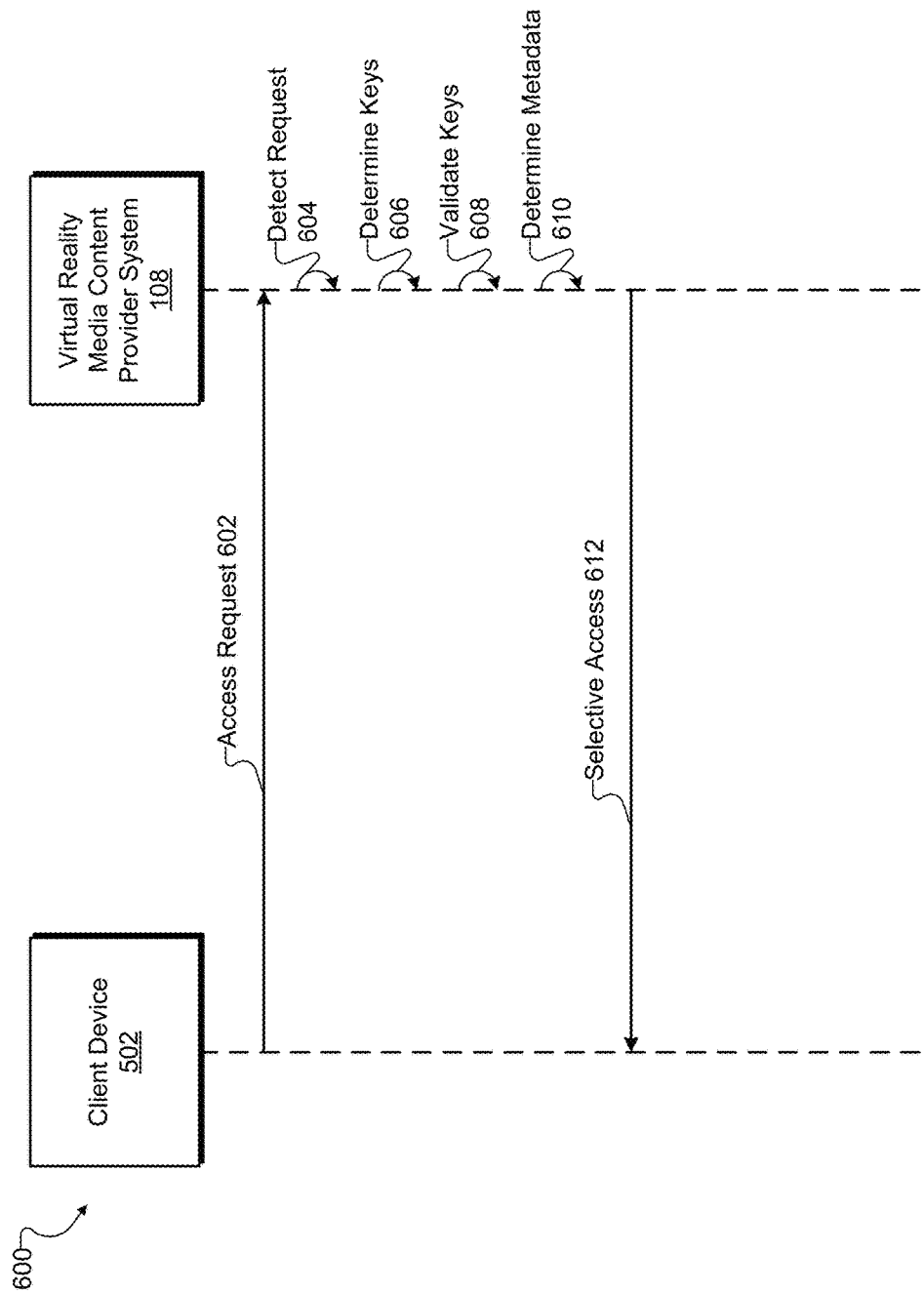
FIG. 6 illustrates an exemplary dataflow illustrating controlled access to virtual reality media content provided by a virtual reality media content provider system according to principles described herein.

FIG. 6 illustrates an exemplary dataflow 600 associated with operations that may be performed by access management facility 402 (where access management facility 402 is implemented by provider system 108, for example) in relation to selectively providing access to virtual reality media content. As shown, provider system 108 may receive a request (operation 602) from client device 502 to access virtual reality media content from provider system 108. Provider system 108 may detect the request (operation 604) in any suitable way and determine an access key and a device key associated with the request (operation 606). Provider system 108 may determine the access key and the device key associated with the request in any suitable way, including by identifying the access key and the device key from the request. Provider system 108 may validate the access key and the device key (operation 608) in any suitable way, such as by determining that the access key and the device key match keys that are maintained by provider system 108 and have active lifespans. Provider system 108 may determine metadata associated with the access key (operation 610) in any suitable way. For example, provider system 108 may use the access key as an identifier by which to request and receive metadata associated with the access key from a data store (e.g., a data store of an authorization server included in provider system 108) included in provider system 108 (not explicitly illustrated in FIG. 6).

Provider system 108 may selectively provide client device 502 access to the virtual reality media content (operation 612). Provider system 108 may selectively provide access to the virtual reality media content based on the access key, the device key, the metadata associated with the access key (e.g., session metadata specific to a user login session and/or non-session-specific metadata), or any combination or sub-combination of the access key, device key, and metadata associated with the access key.

One or more access permissions profiles that have been assigned to the requested virtual reality media content may specify one or more sets of rules to be satisfied by the access key, the device key, the metadata associated with the access key, or any combination or sub-combination thereof in order for access to the virtual reality media content to be granted. Provider system 108 may maintain, access, and use the one or more access permissions profiles to determine whether to provide access or abstain from providing access to the virtual reality media content. A set of rules in an access permissions profile may be defined in advance, by a content owner, producer, provider, or other party, to include any suitable set of conditions as may serve a particular implementation, business relationship, service level agreement, etc.

To illustrate, an access permissions profile may be defined to require that a particular type, make, model, etc. of client device or tethered set of client devices having specific capabilities be associated with an access key for a login session in order for access to certain virtual reality media content to be granted (e.g., to unlock access to certain virtual reality media content behaviors, to certain input motions for virtually moving around an immersive virtual world, to a virtual mini-game object, etc.), that a particular interaction with provider system 108 has occurred during a login session in order for access to certain virtual reality media content to be granted (e.g., that the user has uploaded or commented on virtual reality media content to unlock access to certain virtual reality media content and/or behaviors), that a particular subscription level be associated with an access key in order for access to certain virtual reality media content to be granted (e.g., to unlock access to certain virtual reality media content behaviors, to certain input motions for virtually moving around an immersive virtual world, to a virtual mini-game object, etc.), and/or that any other suitable set of rules be satisfied in order for access to certain virtual reality media content to be granted.

Access management facility 402 may selectively provide access to virtual reality media content in any suitable way. For example, access management facility 402 may direct provider system 108 to provide access or to abstain from providing access to virtual reality media content. Access management facility 402 may be configured to do this at any suitable level of granularity, such as by providing access to or abstaining from providing access to an entire virtual reality world, virtual objects mapped to the virtual reality world, features of virtual objects mapped to the virtual reality world, and/or to any other element of the virtual reality world. Examples of access management facility 402 selectively providing access to specific instances of virtual reality media content will now be described in more detail with reference to FIGS. 7-10, which illustrate examples of content that may be presented as part of an immersive virtual reality world.

Figure 7:
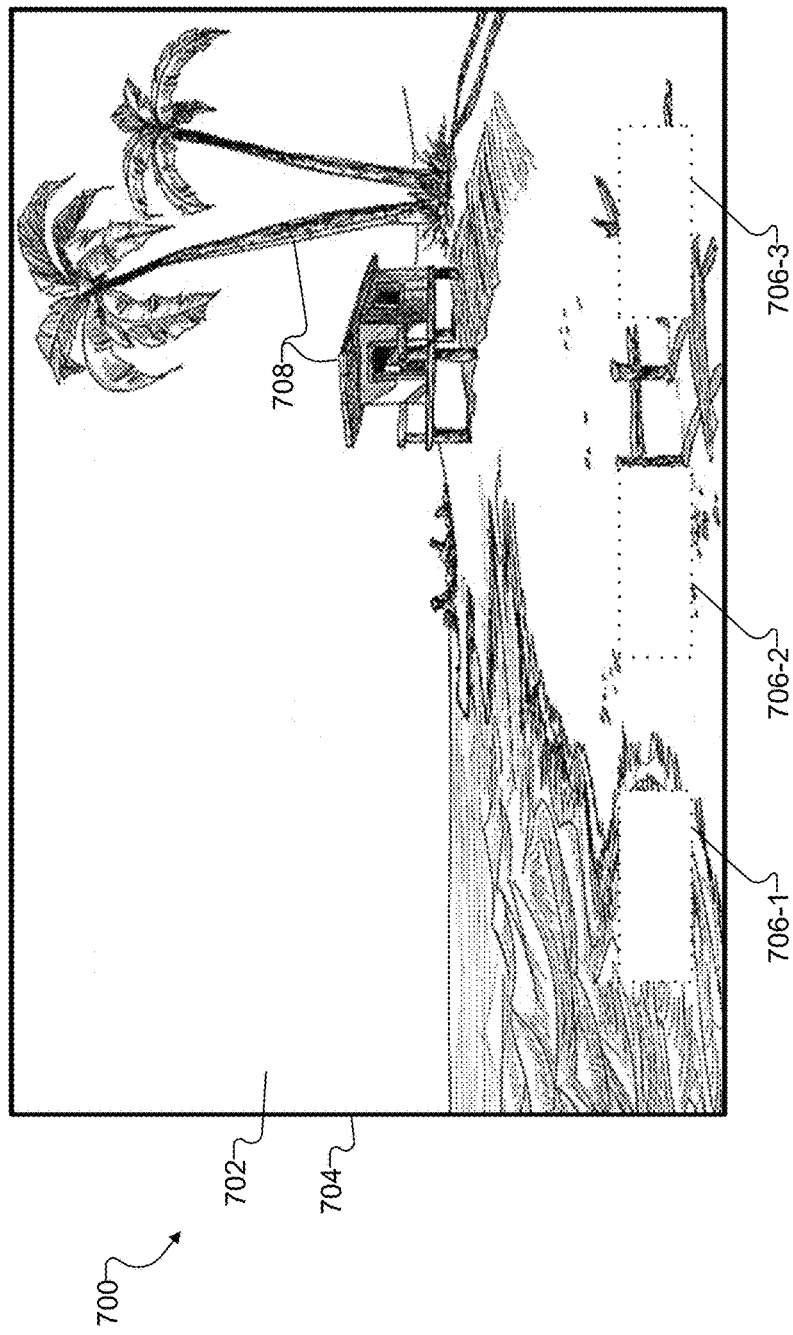
FIGS. 7-10 illustrate examples of content that may be presented within a field of view of an immersive virtual reality world according to principles described herein.

FIG. 7 shows an exemplary field of view of an immersive virtual reality world that includes virtual objects mapped to the immersive virtual reality world. The representation shown in FIG. 7 may represent part of an experience of a user who is experiencing an immersive virtual reality world 700 ("world 700") that includes content 702 being presented within a field of view 704. As shown, world 700 may include content based on camera-captured real-world scenery depicting a tropical beach scene. The user may have entered user input to dynamically direct field of view 704 to include content showing a perspective looking down the beach that includes generic virtual objects 706 (e.g., virtual objects 706-1 through 706-3) and real objects 708 (i.e., camera-captured objects such as a beach shack and palm trees that were present in the real-world scenery rather than integrated into world 700 later). Virtual objects 706 may have each been assigned a respective access permissions profile that specifies a set of rules to be satisfied in order for access to the virtual object and/or features thereof to be provided.

When user requests that the field of view 704 that includes virtual objects 706 be presented, a media player client device being used by the user to access world 700 may send requests for access to virtual objects 706. Provider system 108 may receive and access management facility 402 may detect the requests. In response to detecting the requests, access management facility 402 may perform one or more of the operations described above to selectively provide access to the virtual objects 706 based on the respective access permissions profiles assigned to the virtual objects 706 and on an access key associated with the request, a device key associated with the request, one or more other device keys associated with the access key, metadata associated with the access key, or any combination or sub-combination thereof.

Figure 8:
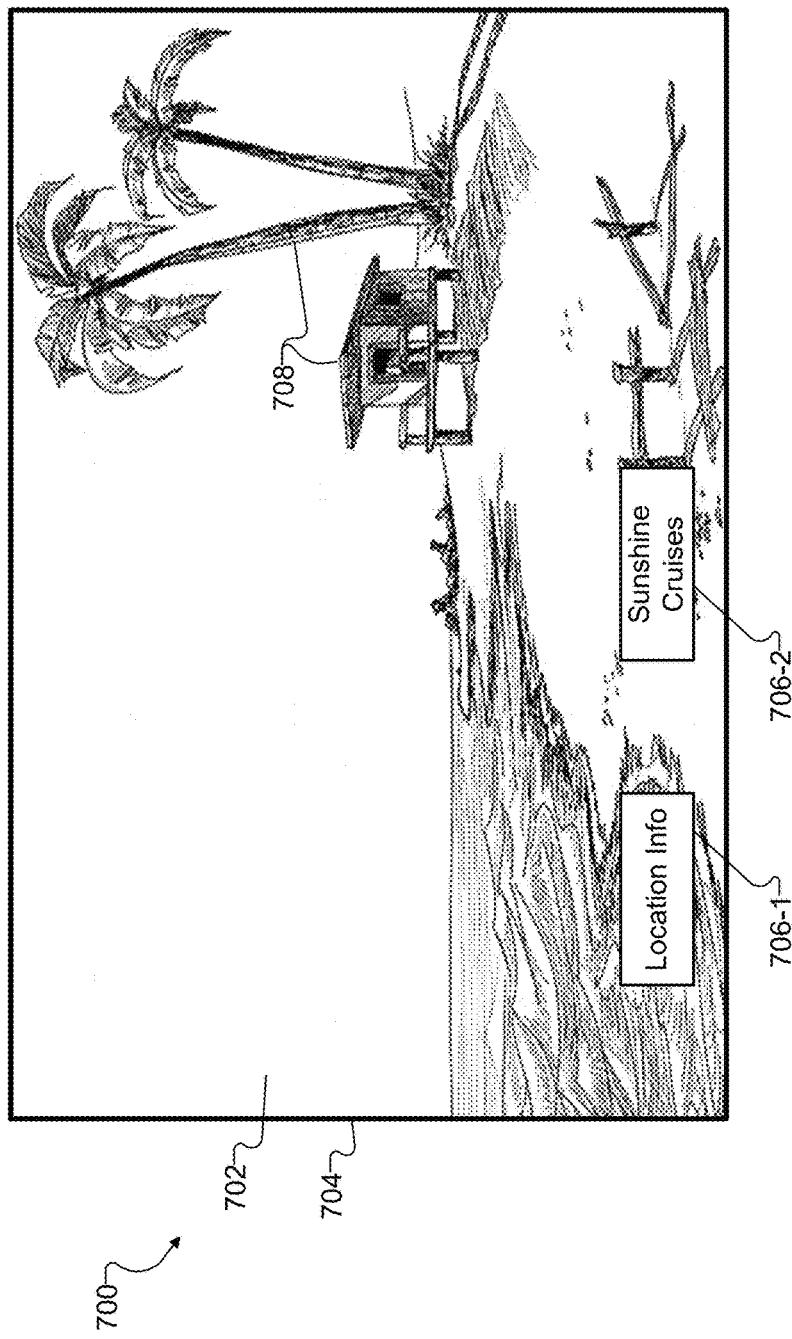

FIG. 8 illustrates an example in which access management facility 402 provides access to virtual objects 706-1 and 706-2 such that virtual objects 706-1 and 706-2 are presented within field of view 704 of world 700 for experiencing by the user as part of world 700. In the illustrated example, virtual object 706-1 represents an informational or menu virtual object associated with information about a geographic location depicted in or otherwise associated with the content 702 of world 700, and virtual object 706-2 represents an informational, promotional, or menu virtual object associated with information about a company, product, or service (e.g., a cruise line). FIG. 8 further illustrates that access management facility 402 abstains from providing access to virtual object 706-3, as indicated by the absence of virtual object 706-3 from field of view 704 of world 700.

FIG. 8 may also illustrate an example in which access management facility 402 provides access to specific features of virtual objects 706-1 and 706-2 such that the specific features of virtual objects 706-1 and 706-2 are presented within field of view 704 of world 700 for experiencing by the user as part of world 700. In the illustrated example, the features of virtual objects 706-1 and 706-2 are textures that are displayed and include textual information. The features of virtual objects 706-1 and 706-2 illustrated in FIG. 8 may be the only features of virtual objects 706-1 and 706-2 or may be subsets of features of virtual objects 706-1 and 706-2. If the illustrated features of virtual objects 706-1 and 706-2 are only subsets of the features of virtual objects 706-1 and 706-2, then FIG. 8 also represents an example in which access management facility 402 abstains from providing access to other, non-illustrated features of virtual objects 706-1 and 706-2. For instance, access management facility 402 may provide access to the textual information texture feature of virtual object 706-1 and abstain from providing access to one or more other features of virtual object 706-1, such as a texture that includes additional textual information, a texture that includes a graphical image, or a behavior associated with virtual object 706-1.

Figure 9:
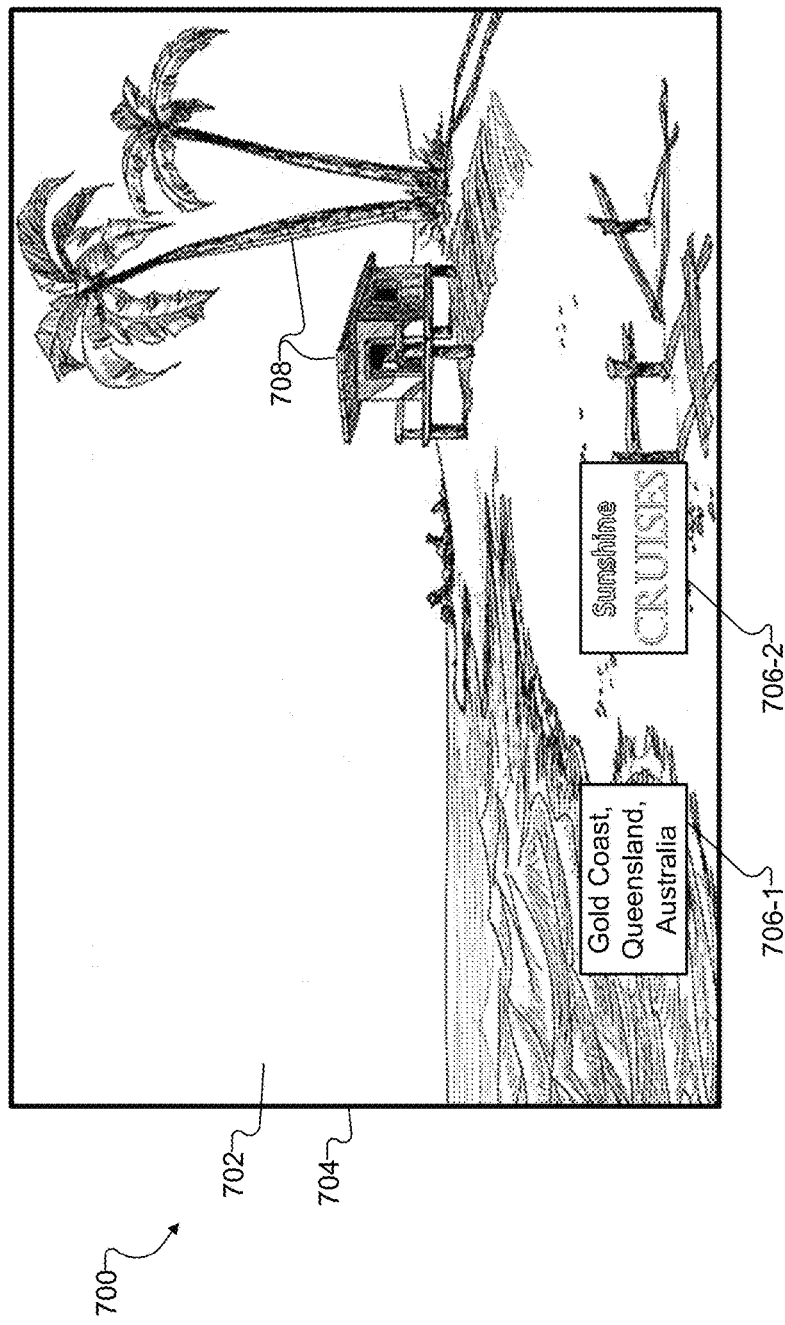

FIG. 9 illustrates an example in which access management facility 402 provides access to a different set of features of virtual objects 706-1 and 706-2 such that the other features of virtual objects 706-1 and 706-2 are presented within field of view 704 of world 700 for experiencing by the user as part of world 700. In the illustrated example, virtual object 706-1 represents an informational or menu virtual object that contains a texture feature displaying specific information about a geographic location depicted in or otherwise associated with the content 702 of world 700, and virtual object 706-2 represents an informational, promotional, or menu virtual object that contains a texture feature displaying a graphical image associated with information about a company, product, or service (e.g., a logo image for a cruise line).

The features of virtual objects 706-1 and 706-2 illustrated in FIG. 9 may be the only features of virtual objects 706-1 and 706-2 or may be subsets of features of virtual objects 706-1 and 706-2. If the illustrated features of virtual objects 706-1 and 706-2 are only subsets of the features of virtual objects 706-1 and 706-2, then FIG. 9 also represents an example in which access management facility 402 abstains from providing access to other, non-illustrated features of virtual objects 706-1 and 706-2. For instance, access management facility 402 may provide access to the textual information texture feature of virtual object 706-1 and abstain from providing access to one or more other features of virtual object 706-1. In other examples, access management facility 402 may provide access to the one or more other features of virtual object 706-1. For example, in addition to the first feature of virtual object 706-1 illustrated in FIG. 9, access management facility 402 may also provide access to a second feature of virtual object 706-1.

Figure 10:
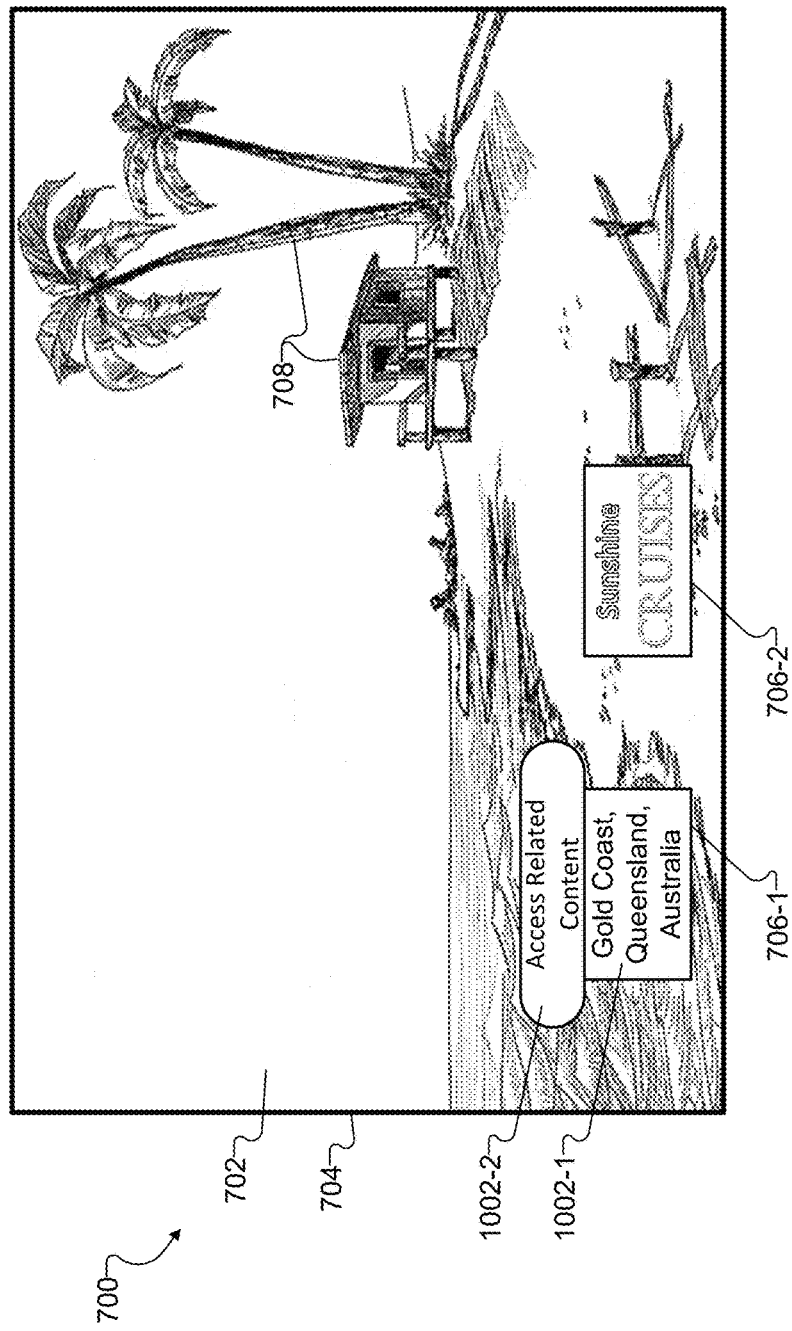

FIG. 10 illustrates an example in which access management facility 402 provides concurrent access to both a first feature 1002-1 and a second feature 1002-2 of virtual object 706-1. As shown, the first feature 1002-1 may include a texture that displays geographic location information, and the second feature 1002-1 may include an option that is selectable by the user to access content that is related to the content 702 of world 700.

In this or a similar manner, access management facility 402 may selectively provide access to specific virtual reality media content elements at various levels of granularity. While certain examples of access management facility 402 selectively providing access to specific elements of virtual reality media content have been described, the examples are illustrative only and not limiting. The same or similar principles as described above may be applied by access management facility 402 to selectively provide access to any element of or associated with virtual reality media content, such as a behavior of the virtual reality media content (e.g., available motion and/or input behaviors), a virtual object that may be selectively presented as part of an immersive virtual world, a feature of the virtual object (e.g., a behavior of the virtual object) that may be selectively presented as part of the virtual object in an immersive virtual world, and/or a particular feature or operation of or associated with the virtual reality media content (e.g., a micro service that may be selectively provided by a micro application as part of virtual reality media content and/or a virtual reality media content service provided by a virtual reality media content service provider).

Figure 11:
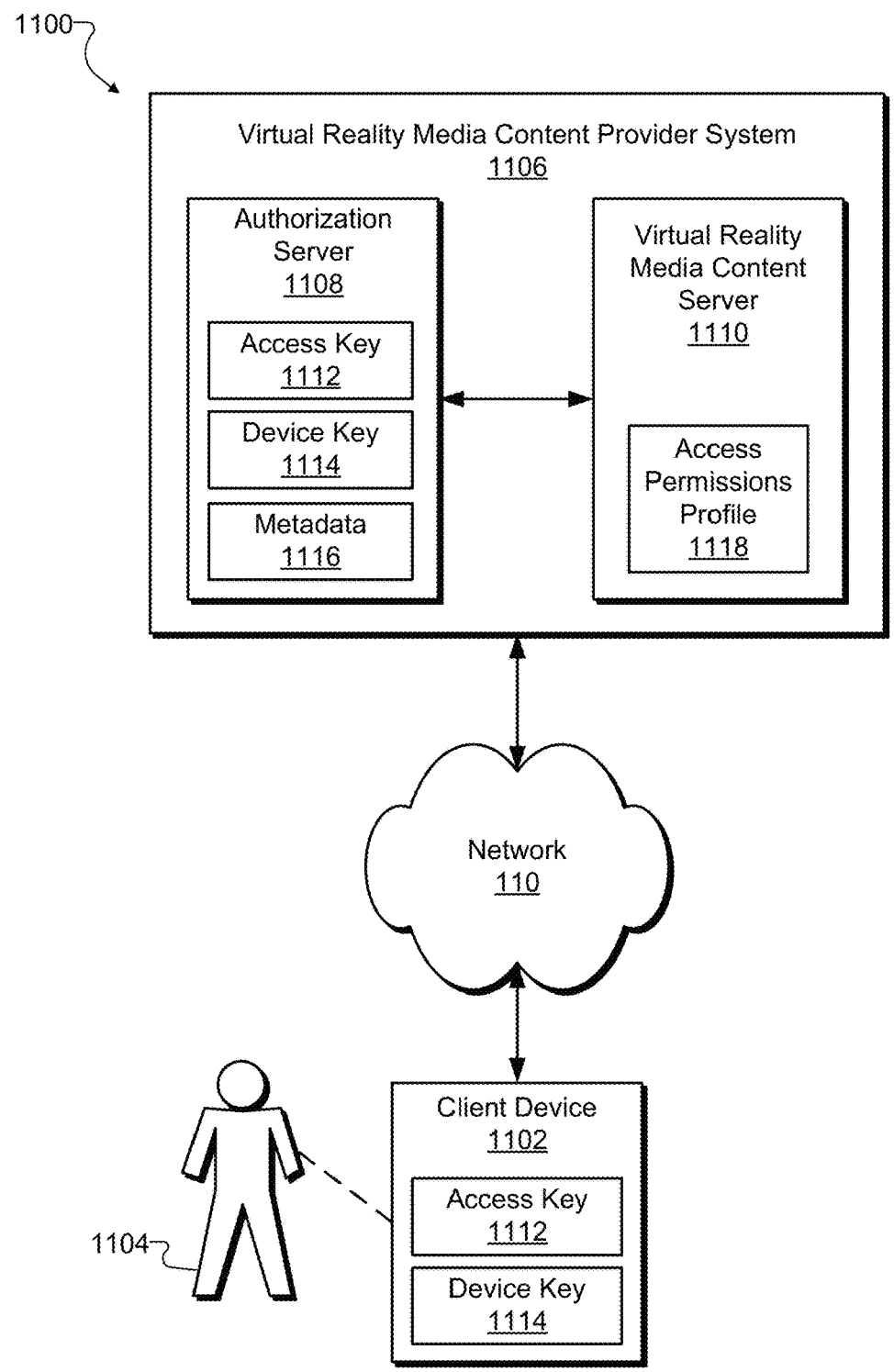
FIGS. 11-12 illustrate exemplary configurations in which a virtual reality media content access control system is implemented to control access to virtual reality media content according to principles described herein.

FIG. 11 illustrates an exemplary configuration 1100 in which system 400 is implemented to control access to virtual reality media content. As shown, configuration 1100 may include a client device 1102 associated with a user 1104 and communicatively coupled to a virtual reality media content provider system 1106 ("provider system 1106") by way of network 110. Client device 1102 may include any suitable device that may be used by user 1104 to interact with provider system 1106, including any of the exemplary client devices described herein. Provider system 1106 may be a particular implementation of provider system 108 in which system 400 is implemented in a particular manner.

As shown, provider system 1106 may include an authorization server 1108 and a virtual reality media content server 1110 ("content server 1110"). System 400 may be implemented by authorization server 1108 and content server 1110 such that authorization server 1108 and content server 1110 may function collaboratively to control access to virtual reality media content available for access from content server 1110. Authorization server 1108 and Content server 1110 may be in communication one with another by way of any suitable communication technologies.

Authorization server 1108 may include or be implemented by any hardware and/or software configured to generate and maintain access keys, device keys, and metadata in any of the ways described herein. As shown, authorization server 1108 may maintain data representative of an access key 1112 for an active user login session between client device 1102 and provider system 1106, a device key 1114 for client device 1102, and metadata 1116 associated with access key 1112. As further shown, client device 1102 may maintain copies of the access key 1112 and the device key 1114.

Content server 1110 may include or be implemented by any hardware and/or software that is distinct from authorization server 1108 (e.g., distinct standalone server devices) and that is suitable for maintaining and distributing virtual reality media content over network 110. For example, content server 1110 may include, without limitation, a set of server devices, devices configured as a content delivery network, a micro application providing a micro service, and/or physical storage media for storing data representative of virtual reality media content. Accordingly, content server 1110 may maintain a library of virtual reality media content programs available for distribution by content server 1110 over network 110 and may selectively provide (i.e., transmit) data representative of virtual reality media content to client device 1102 over network 110.

Content server 1110 may maintain data representative of one or more access permissions profiles that have been defined and assigned to virtual reality media content maintained by content server 1110. As shown in FIG. 11, for example, content server 1110 may maintain data representative of an access permissions profile 1118 assigned to a particular virtual reality media content element.

An example of how authorization server 1108 and content server 1110 may operate collaboratively to control access to virtual reality media content will now be described. Client device 1102 may send a request to access virtual reality media content representative of an immersive virtual reality world from content server 1110. Content server 1110 may receive the request, and identify from the request that access key 1112 and device 1114 are associated with the request. Content server 1110 may provide the access key 1112 and the device key 1114 to authorization server 1108 for validation. Authorization server 1108 may validate the access key 1112 and the device key 1114, including by confirming the respective lifespans maintained by authorization server 1108 for the access key 1112 and the device key 1114 are active. Authorization server 1108 may also use the access key 1112 to identify metadata 1116 that is associated with access key 1112. Authorization server 1108 may then send a key validation confirmation message and data representative of the metadata to content server 1110. Content server 1110 may receive the message and the metadata from authorization sever 1108 and then apply access permissions profile 1118 to determine what access to provide or not provide in response to the request from client device 1102 for access to the immersive virtual reality world. This may include applying a set of rules specified by the access permissions profile 1118 to the access key 1112, device key 1114, metadata 1116, or any combination or sub-combination thereof to determine what access to provide or not provide in response to the request from client device 1102 for access to the immersive virtual reality world. For example, content server 1110 may determine to provide access or to abstain from providing access to a virtual object mapped to the immersive virtual reality world and associated with the access permissions profile 1118.

In this or a similar manner, authorization server 1108 may be leveraged by content server 1110 to selectively provide access to virtual reality media content. Such a collaboration of content server 1110 with authorization sever 1108 may provide an efficient and scalable access control architecture. For example, multiple distinct servers that provide various functions for a virtual reality media content service may each be implemented to similarly collaborate with authorization server 1108 to apply their own access permissions profile to data maintained by authorization server 1108 in order to selectively provide access to the various functions of the virtual reality media content service. Accordingly, any suitable number of function-providing servers may be configured to collaborate with authorization server 1108 and to apply their own access permissions profiles to control access to functionality of the servers in configurable, custom ways. Hence, the virtual reality media content service may be made up of various functions provided by distinct and independent servers.

While the term "server" has been used to describe an authorization server and various service-function-providing servers, such entities may be implemented in any way suitable to provide cloud-based resources to client device 1102 to access a virtual reality media content service. For example, the function-providing entities may include distinct and independent micro applications that provide micro services or functions for the virtual reality media content service. Examples of cloud-based functionality and/or resources such as these may include, without limitation, a virtual reality media content library, a virtual reality media content distributor, an advertisement portal, a content encoder, a content uploader, a content authorizing tool, a transaction interface (e.g., a payment service), etc. In certain examples, such cloud-based functionality and/or resources may be implemented as micro applications.

Figure 12:
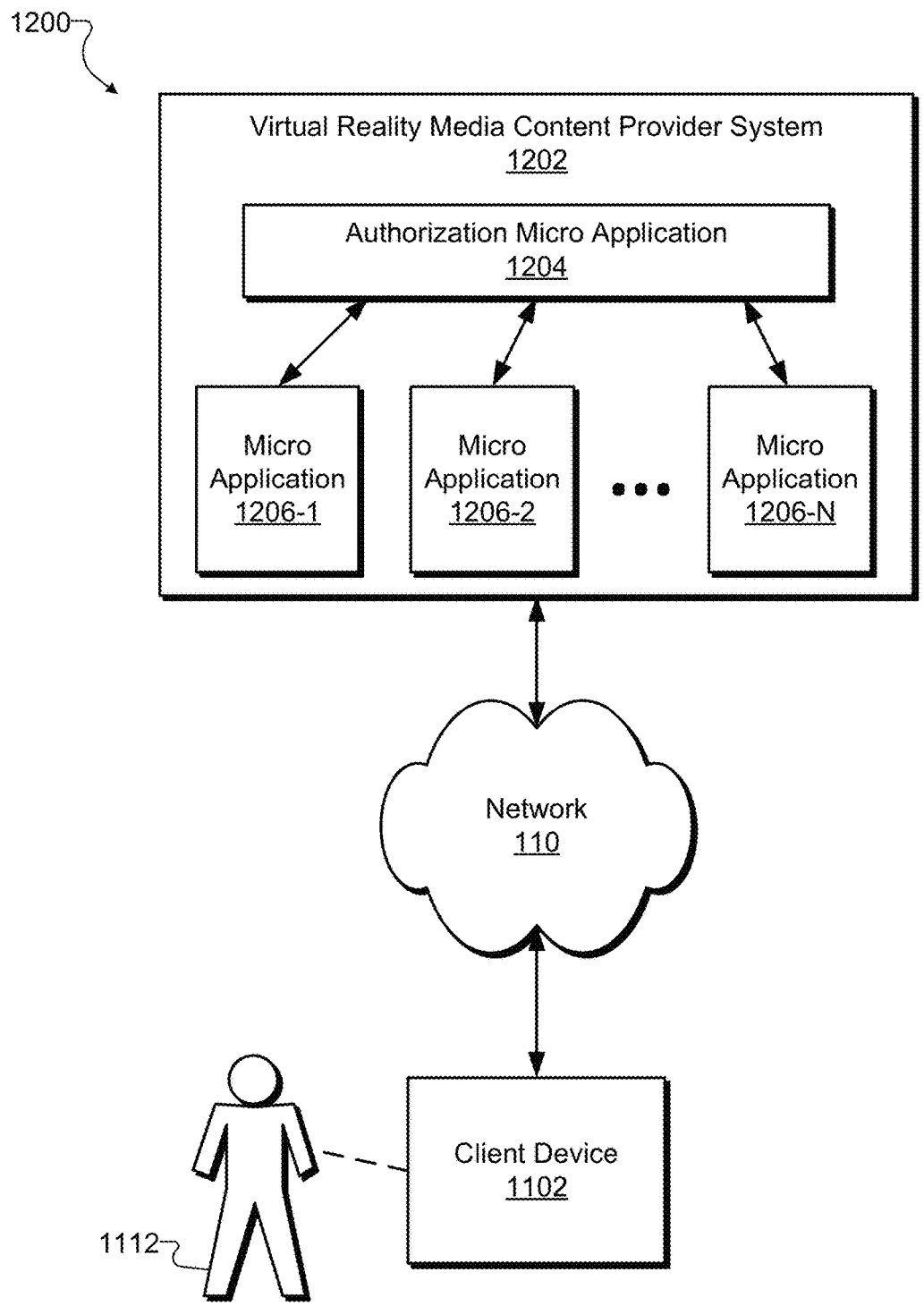

FIG. 12 illustrates an exemplary configuration 1200 in which system 400 is implemented to control access to virtual reality media content. Configuration 1200 may be similar to configuration 1100 and may include multiple cloud-based resources implemented as micro applications that provide micro services for a virtual reality media content service. As shown, configuration 1200 may include a virtual reality media content provider system 1202 that includes an authorization micro application 1204 that may be configured to provide functionality of authorization server 1108 as one or more micro services. As further shown, configuration 1200 may include a set of distinct function-providing micro applications 1206 (e.g., micro application 1206-1 through 1206-N) that may each be configured to provide a particular micro service to the virtual reality media content service.

The configuration 1200 illustrated in FIG. 12 is scalable and customizable in that micro applications may be conveniently added, removed, or modified. For example, a service provider, content owner, or other party may build a new micro application, configure the new micro application to collaborate with authorization micro application 1204, and define access permissions profiles to be used by the new micro application as described herein to selectively provide access to functionality provided by the new micro application based on authorization data maintained by authorization micro application 1204.

Because the distinct micro applications 1206 are configured to collaborate with authorization micro application 1204 as described herein, the micro applications 1206 may effectually share information one with another such that the shared information may be used by any of the micro applications 1206 as a basis for controlling access to virtual reality media content. Accordingly, information associated with a user, a client device, an interaction with a virtual reality media content provider system during a login session, etc. may be passed around among the micro applications 1206 and available for use by the micro applications 1206 to selectively provide access to specific functions and/or content provided by the micro applications 1206. This creates a configuration that is scalable, customizable, and capable of selectively providing virtual reality media content in a tailored manner.

Figure 13:
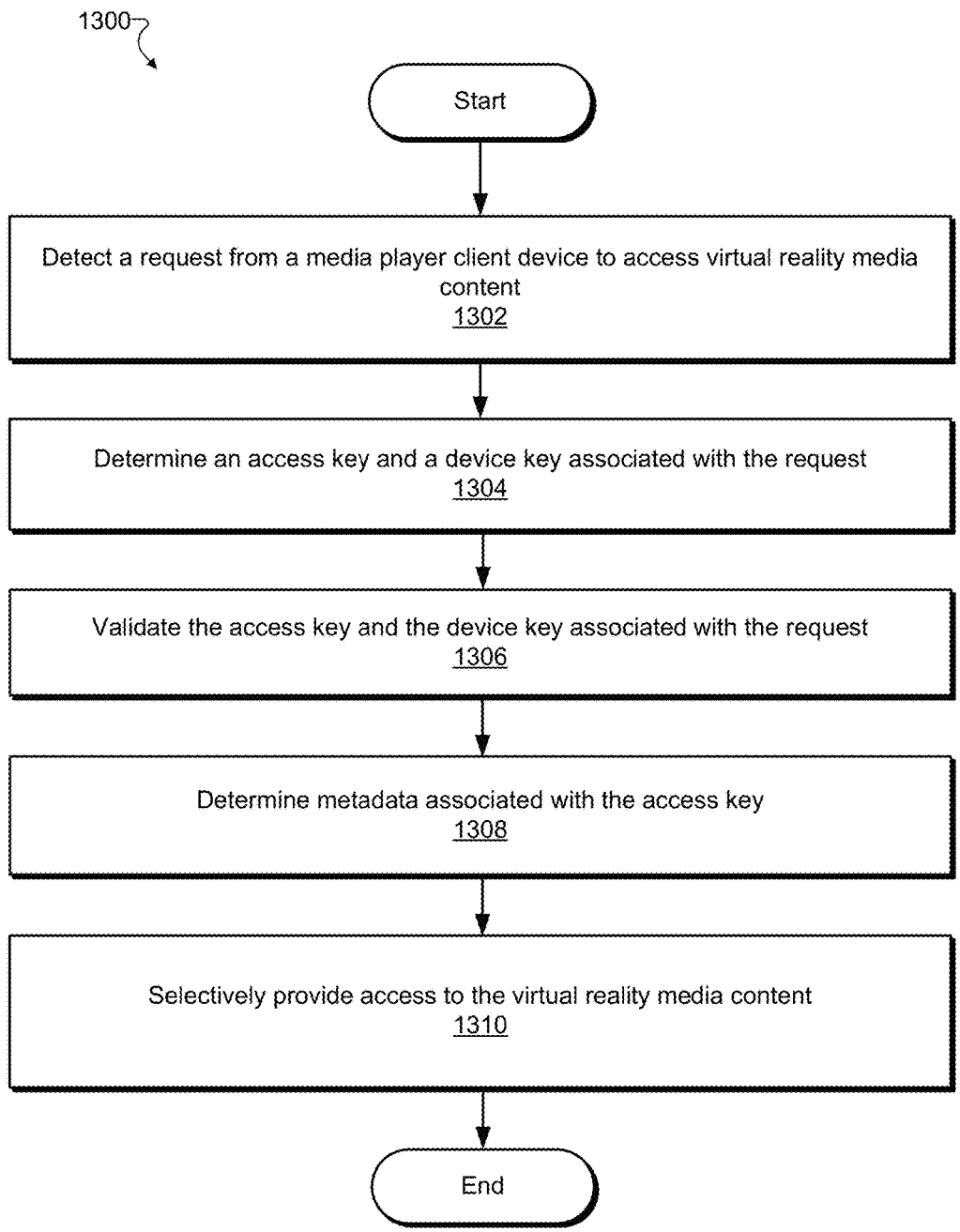
FIGS. 13-14 illustrate exemplary methods of controlling access to virtual reality media content according to principles described herein.

FIG. 13 illustrates an exemplary method 1300 of controlling access to virtual reality media content. While FIG. 13 illustrates exemplary operations according to one embodiment, other embodiments may omit, add to, reorder, and/or modify any of the operations shown in FIG. 13. One or more of the operations shown in FIG. 13 may be performed by system 400 and/or any implementation thereof.

In operation 1302, a virtual reality media content access control system may detect a request from a media player client device to access virtual reality media content. In certain examples, the request may be for a particular element of virtual reality media content, such as a virtual object that has been mapped to an immersive virtual reality world and assigned an access permissions profile. Operation 1302 may be performed in any of the ways described herein.

In operation 1304, the virtual reality media content access control system may determine an access key and a device key associated with the request. Operation 1304 may be performed in any of the ways described herein.

In operation 1306, the virtual reality media content access control system may validate the access key and the device key associated with the request. Operation 1306 may be performed in any of the ways described herein.

In operation 1308, the virtual reality media content access control system may determine metadata associated with the access key. Operation 1308 may be performed in any of the ways described herein.

In operation 1310, the virtual reality media content access control system may selectively provide access to the virtual reality media content based on any of the factors or combination of factors described herein. For example, the virtual reality media content access control system may selectively provide access to the virtual reality media content based on an access permissions profile associated with the virtual reality media content and on at least one of the device key associated with the request and the metadata associated with the access key. Operation 1310 may be performed in any of the ways described herein.

Figure 14:
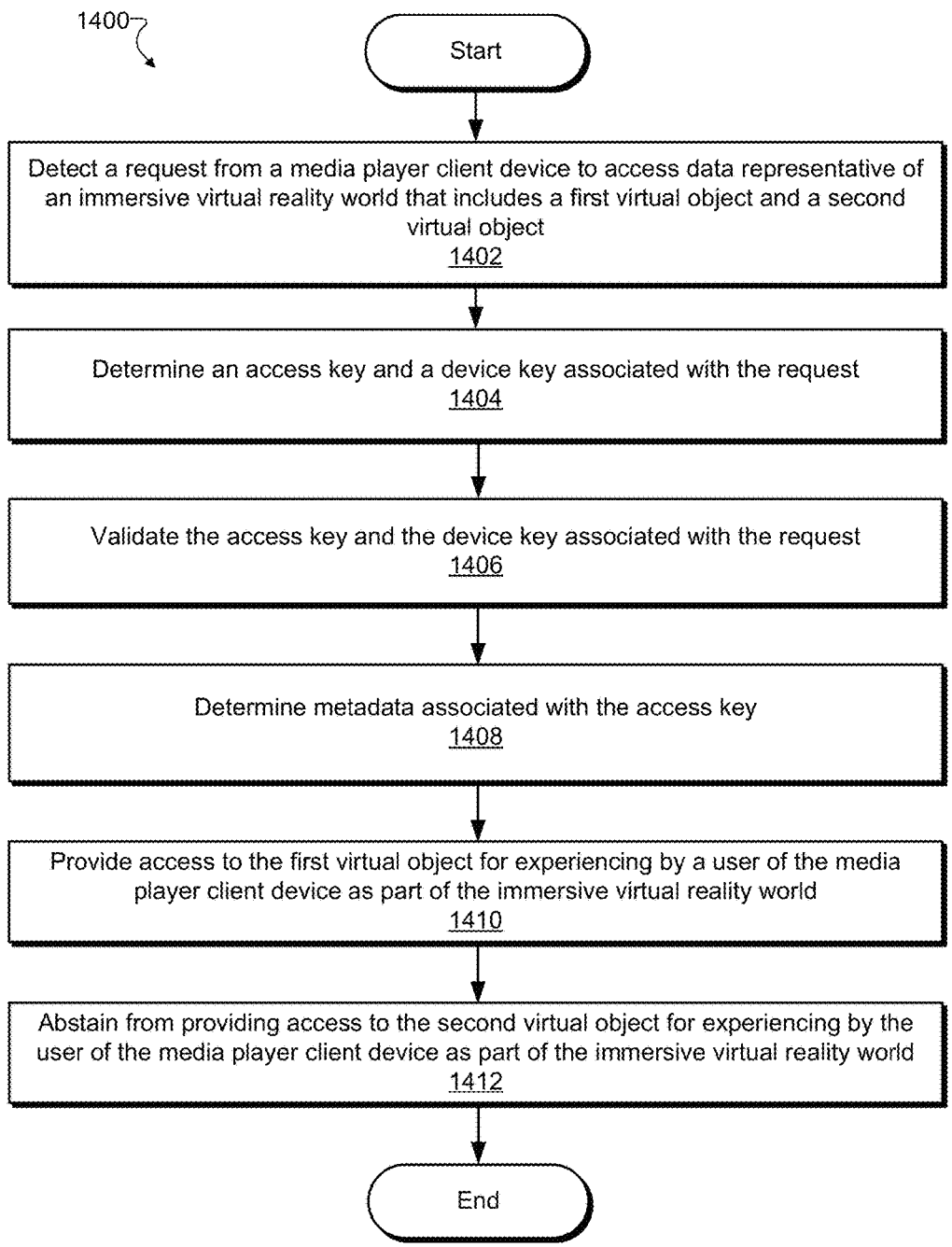

FIG. 14 illustrates an exemplary method 1400 of controlling access to virtual reality media content. While FIG. 14 illustrates exemplary operations according to one embodiment, other embodiments may omit, add to, reorder, and/or modify any of the operations shown in FIG. 14. One or more of the operations shown in FIG. 14 may be performed by system 400 and/or any implementation thereof.

In operation 1402, a virtual reality media content access control system may detect a request from a media player client device to access data representative of an immersive virtual reality world that includes a first virtual object and a second virtual object. The first and second virtual objects may have been mapped to the immersive virtual reality world and assigned respective first and second access permissions profiles. Operation 1402 may be performed in any of the ways described herein.

In operation 1404, the virtual reality media content access control system may determine an access key and a device key associated with the request. Operation 1404 may be performed in any of the ways described herein.

In operation 1406, the virtual reality media content access control system may validate the access key and the device key associated with the request. Operation 1406 may be performed in any of the ways described herein.

In operation 1408, the virtual reality media content access control system may determine metadata associated with the access key. Operation 1408 may be performed in any of the ways described herein.

In operation 1410, the virtual reality media content access control system may provide access to the first virtual object, based on any of the factors or combination of factors described herein, for experiencing by a user of the media player client device as part of the immersive virtual reality world. For example, the virtual reality media content access control system may provide access to the first virtual object based on a first access permissions profile associated with the first virtual object and on the metadata associated with the access key. Operation 1410 may be performed in any of the ways described herein.

In operation 1412, the virtual reality media content access control system may abstain from providing access to the second virtual object, based on any of the factors or combination of factors described herein, for experiencing by the user of the media player client device as part of the immersive virtual reality world. For example, the virtual reality media content access control system may abstain from providing access to the second virtual object based on a second access permissions profile associated with the second virtual object and on the metadata associated with the access key. Operation 1410 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 15:
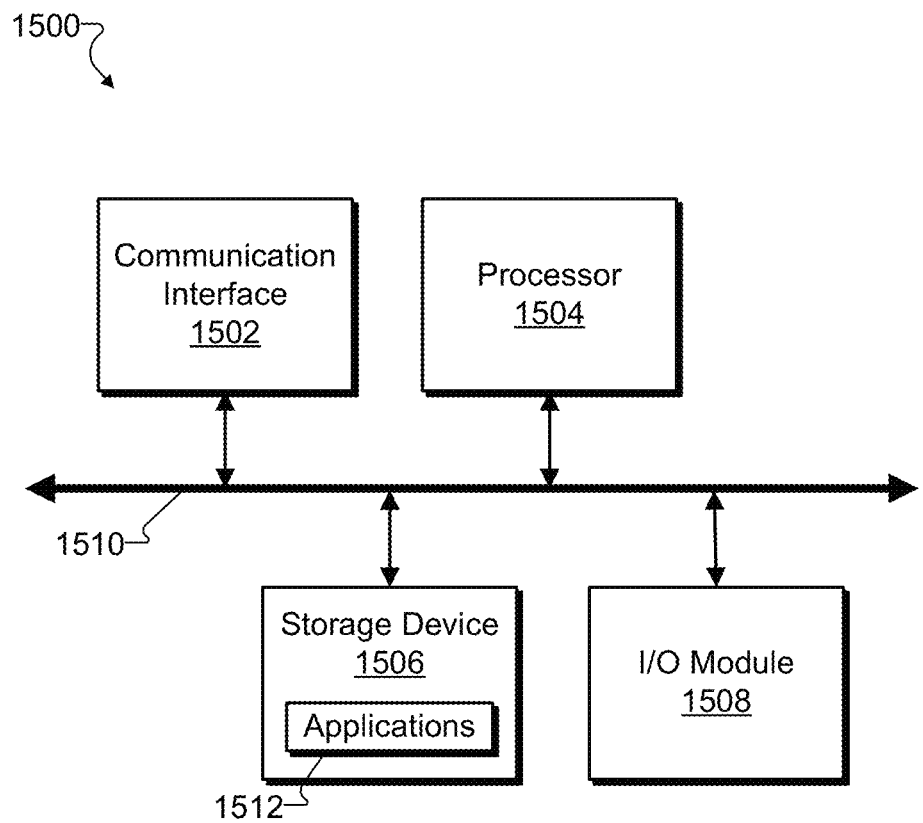
FIG. 15 illustrates an exemplary computing device according to principles described herein.

FIG. 15 illustrates an exemplary computing device 1500 that may be specifically configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1506. For example, data representative of one or more executable applications 1512 configured to direct processor 1504 to perform any of the operations described herein may be stored within storage device 1506. In some examples, data may be arranged in one or more databases residing within storage device 1506.

I/O module 1508 may include one or more I/O modules configured to receive user input and provide user output. One or more I/O modules may be used to receive input for a single virtual reality experience. I/O module 1508 may include any hardware, firmware, software, or combination thereof supportive of input and output capabilities. For example, I/O module 1508 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1500. For example, one or more applications 1512 residing within storage device 1506 may be configured to direct processor 1504 to perform one or more processes or functions associated with access management facility 402. Likewise, storage facility 404 may be implemented by or within storage device 1506.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

detecting, by a virtual reality media content access control system, a request from a media player client device to access data representative of an immersive virtual reality world, the immersive virtual reality world generated from and including camera-captured real-world scenery and a virtual object that has been mapped to the immersive virtual reality world and assigned an access permissions profile;

determining, by the virtual reality media content access control system, an access key and a device key associated with the request, the access key being associated with a user profile of a user of the media player client device and being a session specific access key that is specific to an active user login session with a virtual reality media content provider system and that is invalidated upon termination of the active user login session;

validating, by the virtual reality media content access control system, the access key and the device key associated with the request;

determining, by the virtual reality media content access control system, metadata associated with the access key, the metadata comprising session metadata that is associated with interactions of the user with a virtual reality media content service during the active user login session with the virtual reality media content provider system and that is deleted after termination of the active user login session; and selectively providing, by the virtual reality media content access control system based on the access permissions profile for the virtual object and on at least one of the device key associated with the request and the metadata associated with the access key, access to the virtual object for experiencing by the user of the media player client device as part of the immersive virtual reality world.

2. The method of claim 1, wherein the selectively providing comprises providing, based on the access permissions profile for the virtual object and on at least one of the device key associated with the request and the metadata associated with the access key, a feature of the virtual object for experiencing by the user of the media player client device as part of the immersive virtual reality world.

3. The method of claim 1, wherein the selectively providing comprises abstaining from providing, based on the access permissions profile for the virtual object and on at least one of the device key associated with the request and the metadata associated with the access key, a feature of the virtual object for experiencing by the user of the media player client device as part of the immersive virtual reality world.

4. The method of claim 1, wherein the selectively providing comprises:

providing, based on the access permissions profile for the virtual object and on at least one of the device key associated with the request and the metadata associated with the access key, a first feature of the virtual object for experiencing by the user of the media player client device; and abstaining from providing, based on the access permissions profile for the virtual object and on at least one of the device key associated with the request and the metadata associated with the access key, a second feature of the virtual object for experiencing by the user of the media player client device.

5. The method of claim 1, wherein the validating of the access key and the device key associated with the request comprises confirming that a lifespan of the access key is active and that a lifespan of the device key is active.

6. The method of claim 1, wherein the determining of the metadata associated with the access key comprises:

sending a request for the metadata associated with the access key to an authorization server, the request for the metadata associated with the access key including data representative of the access key; and receiving the metadata associated with the access key from the authorization server in response to the request for the metadata associated with the access key.

7. The method of claim 1, further comprising:

receiving, by the virtual reality media content access control system and prior to the detecting of the request from the media player client device to access data representative of the immersive virtual reality world, a login request from the user to login to a virtual reality media content provider system, the login request including credentials for the user;

authenticating, by the virtual reality media content access control system, the user based on the credentials;

allowing, by the virtual reality media content access control system, an initiation of the active user login session for the user with the virtual reality media content provider system;

generating, by the virtual reality media content access control system, the access key to the active user login session;

assigning, by the virtual reality media content access control system, the access key to the active user login session such that the access key is specific to the active user login session;

tracking, by the virtual reality media content access control system, interactions of the user with the virtual reality media content provider system during the active user login session;

generating, by the virtual reality media content access control system, the session metadata for the active user login session based on the tracked interactions of the user with the virtual reality media content provider system during the active user login session; and storing, by the virtual reality media content access control system and during the active user login session, the generated session metadata as part of the metadata associated with the access key.

8. The method of claim 7, wherein the selectively providing access to the virtual object for experiencing by the user of the media player client device as part of the immersive virtual reality world is based on the generated session metadata that is stored as part of the metadata associated with the access key.

9. The method of claim 1, embodied as computer-executable instructions on at least one non-transitory computer-readable medium.

10. A method comprising:
  detecting, by a virtual reality media content access control system, a request from a media player client device to access data representative of an immersive virtual reality world, the immersive virtual reality world generated from and including camera-captured real-world scenery, a first virtual object that has been mapped to the immersive virtual reality world and assigned a first access permissions profile, and a second virtual object that has been mapped to the immersive virtual reality world and assigned a second access permissions profile;
  determining, by the virtual reality media content access control system, an access key and a device key associated with the request, the access key being associated with a user profile of a user of the media player client device and being a session specific access key that is specific to an active user login session with a virtual reality media content provider system and that is invalidated upon termination of the active user login session;
  validating, by the virtual reality media content access control system, the access key and the device key associated with the request;
  determining, by the virtual reality media content access control system, metadata associated with the access key, the metadata comprising session metadata that is associated with interactions of the user with a virtual reality media content service during the active user login session with the virtual reality media content provider system and that is deleted after termination of the active user login session;
  providing, by the virtual reality media content access control system based on the first access permissions profile and on the metadata associated with the access key, access to the first virtual object for experiencing by the user of the media player client device as part of the immersive virtual reality world; and
  abstaining from providing, by the virtual reality media content access control system based on the second access permissions profile and on the metadata associated with the access key, access to the second virtual object for experiencing by the user of the media player client device as part of the immersive virtual reality world.

11. The method of claim 10, embodied as computer-executable instructions on at least one non-transitory computer-readable medium.

12. A system comprising:
  at least one physical computing device that:
    detects a request from a media player client device to access data representative of an immersive virtual reality world from a virtual reality media content provider system, the immersive virtual reality world generated from and including camera-captured real-world scenery and a virtual object that has been mapped to the immersive virtual reality world and assigned an access permissions profile;
    determines an access key and a device key associated with the request, the access key being associated with a user profile of a user of the media player client device and being a session specific access key that is specific to an active user login session with a virtual reality media content provider system and that is invalidated upon termination of the active user login session;
    validates the access key and the device key associated with the request;
    determines metadata associated with the access key, the metadata comprising session metadata that is associated with interactions of the user with a virtual reality media content service during the active user login session with the virtual reality media content provider system and that is deleted after termination of the active user login session; and
    selectively provides, based on the access permissions profile for the virtual object and on at least one of the device key associated with the request and the metadata associated with the access key, access to the virtual object for experiencing by the user of the media player client device as part of the immersive virtual reality world.

13. The system of claim 12, wherein the at least one physical computing device selectively provides the access to the virtual object by providing, based on the access permissions profile for the virtual object and on at least one of the device key associated with the request and the metadata associated with the access key, a feature of the virtual object for experiencing by the user of the media player client device as part of the immersive virtual reality world.

14. The system of claim 12, wherein the at least one physical computing device selectively provides the access to the virtual object by abstaining from providing, based on the access permissions profile for the virtual object and on at least one of the device key associated with the request and the metadata associated with the access key, a feature of the virtual object for experiencing by the user of the media player client device as part of the immersive virtual reality world.

15. The system of claim 12, wherein the at least one physical computing device selectively provides the access to the virtual object by:
  providing, based on the access permissions profile for the virtual object and on at least one of the device key associated with the request and the metadata associated with the access key, a first feature of the virtual object for experiencing by the user of the media player client device; and
  abstaining from providing, based on the access permissions profile for the virtual object and on at least one of the device key associated with the request and the metadata associated with the access key, a second feature of the virtual object for experiencing by the user of the media player client device.

16. The system of claim 12, wherein the at least one physical computing device determines the metadata associated with the access key by:
  sending a request for the metadata associated with access key to an authorization server, the request for the metadata associated with the access key including data representative of the access key; and
  receiving the metadata associated with the access key from the authorization server in response to the request for the metadata associated with access key.

17. The system of claim 12, wherein the at least one physical computing device:
  receives, prior to the detecting of the request from the media player client device to access data representative of the immersive virtual reality world, a login request from the user to login to the virtual reality media content provider system, the login request including credentials for the user;

authenticates the user based on the credentials;

allows an initiation of the active user login session for the user with the virtual reality media content provider system;

generates the access key to the active user login session;

assigns the access key to the active user login session such that the access key is specific to the active user login session;

tracks interactions of the user with the virtual reality media content provider system during the active user login session;

generates the session metadata for the active user login session based on the tracked interactions of the user with the virtual reality media content provider system during the active user login session; and stores, during the active user login session, the generated session metadata as part of the metadata associated with the access key.

18. The system of claim 17, wherein the at least one physical computing device selectively provides the access to the virtual object by providing access to the virtual object for experiencing by the user of the media player client device as part of the immersive virtual reality world based on the generated session metadata that is stored as part of the metadata associated with the access key.

* * * * *